United States Patent
Sharma et al.

(10) Patent No.: US 12,104,533 B2
(45) Date of Patent: Oct. 1, 2024

(54) METHODS AND APPARATUS FOR GAS TURBINE FRAME FLOW PATH HARDWARE COOLING

(71) Applicant: General Electric Company, Schenectady, NY (US)

(72) Inventors: Ashish Sharma, Garching (DE); Gunter Wilfert, Garching (DE); Andrea Milli, Garching (DE); Raymond Martell, Wyoming, OH (US); Tomasz Berdowski, Warsaw (PL); Piotr Kulinski, Warsaw (PL); Lukasz Janczak, Warsaw (PL)

(73) Assignee: GENERAL ELECTRIC COMPANY, Cincinnati, OH (US)

(*) Notice: Subject to any disclaimer, the term of this patent is extended or adjusted under 35 U.S.C. 154(b) by 0 days.

(21) Appl. No.: 16/858,277

(22) Filed: Apr. 24, 2020

(65) Prior Publication Data
US 2021/0332756 A1    Oct. 28, 2021

(51) Int. Cl.
*F02C 7/18*    (2006.01)
(52) U.S. Cl.
CPC ................................ *F02C 7/18* (2013.01)
(58) Field of Classification Search
CPC . F02C 7/18; F01D 25/12; F01D 25/14; F01D 9/06; F01D 9/04
See application file for complete search history.

(56) References Cited

U.S. PATENT DOCUMENTS

| 5,639,100 | A | * | 6/1997 | Garrigues | F16L 23/20 277/614 |
|---|---|---|---|---|---|
| 6,375,415 | B1 | | 4/2002 | Burdgick | |
| 7,360,769 | B2 | * | 4/2008 | Bennett | F01D 11/005 277/641 |
| 7,789,621 | B2 | * | 9/2010 | Dierksmeier | F01D 5/187 416/241 B |
| 8,474,900 | B2 | | 7/2013 | Gonin | |
| 8,641,362 | B1 | | 2/2014 | Liang | |
| 8,756,911 | B1 | | 6/2014 | Liang | |

(Continued)

FOREIGN PATENT DOCUMENTS

| CN | 1568397 | 1/2005 |
|---|---|---|
| CN | 102216568 | 10/2011 |

(Continued)

OTHER PUBLICATIONS

Wikipedia, "Auxetics," In Wikipedia, Retrieved on Feb. 25, 2020, Retrieved from the Internet: <https://en.wikipedia.org/wiki/Auxetics> 6 pages.

(Continued)

*Primary Examiner* — Arun Goyal
*Assistant Examiner* — Henry Ng
(74) *Attorney, Agent, or Firm* — HANLEY, FLIGHT & ZIMMERMAN, LLC

(57) ABSTRACT

Methods and apparatus for gas turbine frame flow path hardware cooling are disclosed. An example engine fan case includes an outer band and an inner band, the outer band and the inner band connected using a double-walled vane, the vane including openings to pass cooling air flow from the outer band to an airfoil of the fairing, and an end segment seal, the seal formed on an edge of the fairing using an auxetic material.

12 Claims, 14 Drawing Sheets

(56) References Cited

U.S. PATENT DOCUMENTS

| | | | |
|---|---|---|---|
| 9,045,216 B2 | 6/2015 | Christenson et al. | |
| 9,206,742 B2 | 12/2015 | Chuong et al. | |
| 9,316,153 B2 | 4/2016 | Patat et al. | |
| 9,528,440 B2 | 12/2016 | Schott et al. | |
| 9,567,873 B2 | 2/2017 | Ueda et al. | |
| 9,915,151 B2* | 3/2018 | Weaver | F01D 5/189 |
| 9,938,858 B2 | 4/2018 | Klingels | |
| 9,945,251 B2 | 4/2018 | Yeager et al. | |
| 9,982,564 B2 | 5/2018 | Yeager et al. | |
| 10,280,775 B2* | 5/2019 | Liebl | B22F 10/20 |
| 10,465,708 B2 | 11/2019 | Clemen et al. | |
| 2009/0155050 A1* | 6/2009 | Broomer | F01D 25/12 |
| | | | 415/115 |
| 2011/0081235 A1* | 4/2011 | Shah | F03G 7/06 |
| | | | 415/170.1 |
| 2011/0268580 A1* | 11/2011 | Bryk | F01D 25/246 |
| | | | 416/244 R |
| 2012/0274034 A1* | 11/2012 | Bouchard | F16J 15/0881 |
| | | | 277/650 |
| 2014/0079530 A1 | 3/2014 | Ferch et al. | |
| 2014/0205447 A1 | 7/2014 | Patat et al. | |
| 2014/0248128 A1 | 9/2014 | Budnick et al. | |
| 2014/0248152 A1 | 9/2014 | Chuong et al. | |
| 2014/0251585 A1 | 9/2014 | Kusuda et al. | |
| 2014/0271101 A1* | 9/2014 | Slavens | F01D 5/187 |
| | | | 415/1 |
| 2014/0290272 A1 | 10/2014 | Mulcaire | |
| 2015/0240660 A1 | 8/2015 | Sonokawa et al. | |
| 2015/0267616 A1 | 9/2015 | Verseux | |
| 2015/0285095 A1 | 10/2015 | Yeager et al. | |
| 2015/0292356 A1 | 10/2015 | Yeager et al. | |
| 2015/0330248 A1 | 11/2015 | Budnick et al. | |
| 2015/0330249 A1 | 11/2015 | Budnick | |
| 2015/0330250 A1 | 11/2015 | Scott et al. | |
| 2015/0337681 A1 | 11/2015 | Scott et al. | |
| 2015/0337682 A1 | 11/2015 | Yeager et al. | |
| 2015/0345397 A1* | 12/2015 | Bunker | F01D 5/188 |
| | | | 416/95 |
| 2015/0369079 A1* | 12/2015 | McCaffrey | F01D 17/16 |
| | | | 415/148 |
| 2016/0025009 A1 | 1/2016 | Morenko et al. | |
| 2016/0090914 A1 | 3/2016 | Lyons | |
| 2016/0169108 A1 | 6/2016 | Peters et al. | |
| 2016/0177761 A1 | 6/2016 | Huizenga et al. | |
| 2016/0201472 A1* | 7/2016 | Okajima | F01D 25/246 |
| | | | 415/177 |
| 2016/0208647 A1 | 7/2016 | Cherolis et al. | |
| 2016/0215641 A1* | 7/2016 | Farah | F01D 11/005 |
| 2016/0237854 A1 | 8/2016 | Grant et al. | |
| 2016/0245180 A1 | 8/2016 | Todorovic et al. | |
| 2016/0265439 A1 | 9/2016 | Winn et al. | |
| 2016/0281524 A1* | 9/2016 | Wilber | F01D 9/041 |
| 2016/0348585 A1 | 12/2016 | Marini et al. | |
| 2017/0058684 A1* | 3/2017 | Correia | F01D 25/005 |
| 2017/0107851 A1 | 4/2017 | Lefebvre et al. | |
| 2019/0271237 A1 | 9/2019 | Martin et al. | |
| 2019/0345833 A1* | 11/2019 | Thornton | F01D 25/12 |
| 2020/0080434 A1* | 3/2020 | Thomas | F01D 9/042 |

FOREIGN PATENT DOCUMENTS

| | | |
|---|---|---|
| CN | 105715311 | 6/2016 |
| CN | 106014493 | 10/2016 |
| CN | 107013257 | 8/2017 |
| EP | 1548231 | 6/2005 |
| EP | 2708701 | 3/2014 |
| EP | 2784267 | 10/2014 |
| EP | 2944769 | 11/2015 |
| EP | 3034802 | 6/2016 |
| EP | 3034847 | 6/2016 |
| WO | 2014051691 | 4/2014 |
| WO | 2014105515 | 7/2014 |
| WO | 2014105573 | 7/2014 |
| WO | 2014105577 | 7/2014 |
| WO | 2014105599 | 7/2014 |
| WO | 2014105616 | 7/2014 |
| WO | 2014105781 | 7/2014 |
| WO | 2014116626 | 7/2014 |
| WO | 2014133648 | 9/2014 |
| WO | 2014143317 | 9/2014 |
| WO | 2014175969 | 10/2014 |
| WO | 2015054095 | 4/2015 |
| WO | 2016086810 | 6/2016 |

OTHER PUBLICATIONS

The State Intellectual Property Office of The P.R. of China, "First Office Action and Search Report," dated Jan. 6, 2023, issued in connection with Chinese Application No. 202110442916.2, 16 pages.

* cited by examiner

FIG. 12B    FIG. 12C

METHODS AND APPARATUS FOR GAS TURBINE FRAME FLOW PATH HARDWARE COOLING

FIELD OF THE DISCLOSURE

This disclosure relates generally to turbine engines and, more particularly, to methods and apparatus for gas turbine frame flow path hardware cooling.

BACKGROUND

Turbine engines are some of the most widely-used power generating technologies. Gas turbines are an example of an internal combustion engine that uses a burning air-fuel mixture to produce hot gases that spin the turbine, thereby generating power. Application of gas turbines can be found in aircraft, trains, ships, electrical generators, gas compressors, and pumps. For example, modern aircraft rely on a variety of gas turbine engines as part of a propulsion system to generate thrust, including a turbojet, a turbofan, a turboprop, and an afterburning turbojet. Such engines include a combustion section, a compressor section, a turbine section, and an inlet, providing high power output with a high thermal efficiency.

In operation, a flow path is formed in the engine with air entering the inlet and flowing to the compressor section. In the compressor section, one or more axial compressors progressively compress the air until the compressed air reaches the combustion section, thereby creating combustion gases. The combustion gases flow from the combustion section through a hot gas path defined within the turbine section and then exit the turbine via an exhaust section. Turbine frame flow path hardware permits cooling of turbine components given that the turbine engine is exposed to high temperatures during operation. A turbine frame acts as a supporting structure, connecting a high pressure shaft's rear bearing with a turbine housing and forming an aerodynamic transition duct between a high pressure turbine and a low pressure turbine of the turbine section. The turbine frame routes the flow of hot gases exiting the high pressure turbine past structural components and tubes toward the low pressure turbine. At the same time, the turbine frame supplies both the high pressure turbine and the low pressure turbine with cooling air using the flow path hardware. However, inadequate cooling reduces the types of materials that can be used in turbine frame structures and limits turbine efficiency. Accordingly, turbine frame flow path hardware that permits increased operating temperatures would be welcomed in the technology.

BRIEF DESCRIPTION OF THE DRAWINGS

FIG. 12B illustrates an example structural arrangement of an auxetic material as part of the seal structure of FIG. 12A.

FIG. 12C illustrates an example use of the auxetic material of FIG. 12B as part of the seal structure of FIG. 12A.

Figure 1:
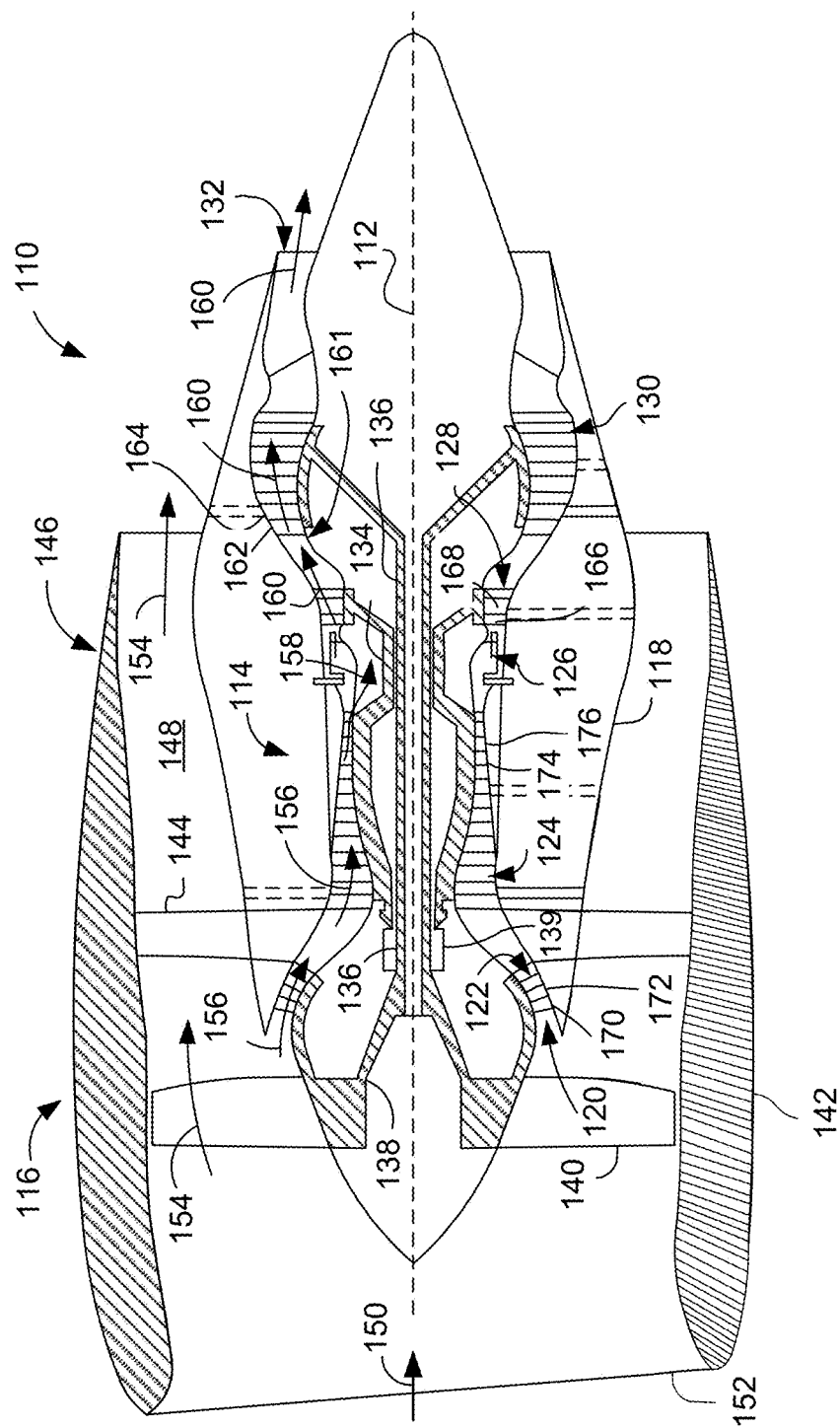
FIG. 1 is a schematic cross-sectional view of an example high-bypass turbofan-type gas turbine engine.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts. Although the figures show layers and regions with clean lines and boundaries, some or all of these lines and/or boundaries may be idealized. In reality, the boundaries and/or lines may be unobservable, blended, and/or irregular.

BRIEF SUMMARY

Methods and apparatus for gas turbine frame flow path hardware cooling are disclosed.

Certain examples provide an engine fan case fairing, the fairing including an outer band and an inner band, the outer band and the inner band connected using a double-walled vane. The vane includes openings to pass cooling air flow from the outer band to an airfoil of the fairing. The fairing further includes an end segment seal, the seal formed on an edge of the fairing using an auxetic material.

Certain examples provide a method to cool a fan case fairing, the method including directing cooling air flow radially inward through a first passage of the fairing, the first passage to direct the air flow through a turbine frame, the first passage of the fairing formed inside a strut, the strut positioned within a double-walled vane of the fairing. The method further includes directing cooling air flow through a second passage of the fairing, the second passage of the fairing to direct the cooling air flow from the strut to the double-walled vane of the fairing, the vane including openings to pass cooling air flow to an airfoil of the fairing.

Certain examples provide an engine fan case fairing, the fairing including means for directing cooling air flow radially inward through a turbine frame, the means to direct cooling air flow radially inward formed inside a strut positioned within a double-walled vane of the fairing. The fairing further includes means for directing the cooling air flow from the strut to the double-walled vane of the fairing, the vane including openings to pass cooling air flow to an airfoil of the fairing.

DETAILED DESCRIPTION

During operation, a turbine engine is exposed to high temperatures, high pressures, and high speeds. A turbine frame, such as a turbine center frame (TCF), acts as a supporting structure in the turbine engine, connecting a high-pressure shaft's rear bearing with the turbine housing and forming an aerodynamic transition duct between the high-pressure turbine and the low-pressure turbine. When the turbine engine is implemented as a jet engine, shafts can be supported by a minimum of two bearings, with one bearing (e.g., a thrust ball bearing) to support axial and radial loads, and another bearing (e.g., cylinder roller bearing) to support radial loads. Given that bearing loads are transferred to the outer casing through the turbine frame structure, this area is subject to very high stresses. As such, the turbine frame must be able to withstand the resulting loads, in addition to being able to permanently withstand temperatures in excess of 1,000 degrees Celsius. Given the high temperatures, materials used for turbine frame(s) (e.g., turbine center frame (TCF), turbine vane frame (TVF), turbine mid frame (TMF), and/or a turbine rear frame (TRF)) should have high temperature tolerance and a low coefficient of thermal expansion, given that the capability to use materials able to withstand higher operating temperatures within the engine allows for higher engine efficiency.

A turbine frame can route the flow of hot gases exiting the high-pressure turbine past structural components and tubes toward the low-pressure turbine using flow path hardware (e.g., fairings). However, fairings that are uncooled or inadequately cooled are limited in their capacity to withstand high temperatures commonly present in turbine frames. Such uncooled fairings limit flow path hardware ability to withstand higher operating temperatures. Methods and apparatus for improved gas turbine frame flow path hardware cooling allow for increased tolerance of turbine frames to higher operating temperatures.

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized. The following detailed description is therefore, provided to describe an exemplary implementation and not to be taken limiting on the scope of the subject matter described in this disclosure. Certain features from different aspects of the following description may be combined to form yet new aspects of the subject matter discussed below.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

As used herein, the terms "system," "unit," "module,", "engine,", "component," etc., may include a hardware and/or software system that operates to perform one or more functions. For example, a module, unit, or system may include a computer processor, controller, and/or other logic-based device that performs operations based on instructions stored on a tangible and non-transitory computer readable storage medium, such as a computer memory. Alternatively, a module, unit, or system may include a hard-wires device that performs operations based on hard-wired logic of the device. Various modules, units, engines, and/or systems shown in the attached figures may represent the hardware that operates based on software or hardwired instructions, the software that directs hardware to perform the operations, or a combination thereof.

A turbine engine, also called a combustion turbine or a gas turbine, is a type of internal combustion engine. Turbine engines are commonly utilized in aircraft and power-generation applications. As used herein, the terms "asset," "aircraft turbine engine," "gas turbine," "land-based turbine engine," and "turbine engine" are used interchangeably. A basic operation of the turbine engine includes an intake of fresh atmospheric air flow through the front of the turbine engine with a fan. In some examples, the air flow travels through an intermediate-pressure compressor or a booster compressor located between the fan and a high-pressure compressor. The booster compressor is used to supercharge or boost the pressure of the air flow prior to the air flow entering the high-pressure compressor. The air flow can then travel through the high-pressure compressor that further pressurizes the air flow. The high-pressure compressor includes a group of blades attached to a shaft. The blades spin at high speed and subsequently compress the air flow. The high-pressure compressor then feeds the pressurized air flow to a combustion chamber. In some examples, the high-pressure compressor feeds the pressurized air flow at speeds of hundreds of miles per hour. In some instances, the combustion chamber includes one or more rings of fuel injectors that inject a steady stream of fuel into the combustion chamber, where the fuel mixes with the pressurized air flow.

In the combustion chamber of the turbine engine, the fuel is ignited with an electric spark provided by an igniter, where the fuel in some examples burns at temperatures of more than 1,000 degrees Celsius. The resulting combustion produces a high-temperature, high-pressure gas stream (e.g., hot combustion gas) that passes through another group of blades of a turbine. The turbine includes an intricate array of alternating rotating and stationary airfoil-section blades. As the hot combustion gas passes through the turbine, the hot combustion gas expands, causing the rotating blades to spin. The rotating blades serve at least two purposes. A first purpose of the rotating blades is to drive the booster compressor and/or the high-pressure compressor to draw more pressured air into the combustion chamber. For example, the turbine is attached to the same shaft as the high-pressure compressor in a direct-drive configuration, thus, the spinning of the turbine causes the high-pressure compressor to spin. A second purpose of the rotating blades is to spin a generator operatively coupled to the turbine section to produce electricity, and/or to drive a rotor, fan or propeller. For example, the turbine can generate electricity to be used by an aircraft, a power station, etc. In the example of an aircraft turbine engine, after passing through the turbine, the hot combustion gas exits the aircraft turbine engine through a nozzle at the back of the aircraft turbine engine.

Referring now to the drawings, wherein identical numerals indicate the same elements throughout the figures, FIG. 1 is a schematic cross-sectional view of an example high-bypass turbofan-type gas turbine engine 110 ("turbofan 110"). As shown in FIG. 1, the turbofan 110 defines a longitudinal or axial centerline axis 112 extending therethrough for reference. In general, the turbofan 110 includes a core turbine or gas turbine engine 114 disposed downstream from a fan section 116.

The core turbine engine 114 generally includes a substantially tubular outer casing 118 that defines an annular inlet 120. The outer casing 118 can be formed from a single casing or multiple casings. The outer casing 118 encloses, in serial flow relationship, a compressor section having a booster or low pressure compressor 122 ("LP compressor 122") and a high pressure compressor 124 ("HP compressor 124"), a combustion section 126, a turbine section having a high pressure turbine 128 ("HP turbine 128") and a low pressure turbine 130 ("LP turbine 130"), and an exhaust section 132. A high pressure shaft or spool 134 ("HP shaft 134") drivingly couples the HP turbine 128 and the HP compressor 124. A low pressure shaft or spool 136 ("LP shaft 136") drivingly couples the LP turbine 130 and the LP compressor 122. The LP shaft 136 can also couple to a fan spool or shaft 138 of the fan section 116. In some examples, the LP shaft 136 is coupled directly to the fan shaft 138 (e.g., a direct-drive configuration). In alternative configurations, the LP shaft 136 can couple to the fan shaft 138 via a reduction gear 139 (e.g., an indirect-drive or geared-drive configuration).

As shown in FIG. 1, the fan section 116 includes a plurality of fan blades 140 coupled to and extending radially outwardly from the fan shaft 138. An annular fan casing or nacelle 142 circumferentially encloses the fan section 116 and/or at least a portion of the core turbine 114. The nacelle 142 can be supported relative to the core turbine 114 by a plurality of circumferentially-spaced apart outlet guide vanes 144. Furthermore, a downstream section 146 of the nacelle 142 can enclose an outer portion of the core turbine 114 to define a bypass airflow passage 148 therebetween.

As illustrated in FIG. 1, air 150 enters an inlet portion 152 of the turbofan 110 during operation thereof. A first portion 154 of the air 150 flows into the bypass flow passage 148, while a second portion 156 of the air 150 flows into the inlet 120 of the LP compressor 122. One or more sequential stages of LP compressor stator vanes 170 and LP compressor rotor blades 172 coupled to the LP shaft 136 progressively compress the second portion 156 of the air 150 flowing through the LP compressor 122 en route to the HP compressor 124. Next, one or more sequential stages of HP compressor stator vanes 174 and HP compressor rotor blades 176 coupled to the HP shaft 134 further compress the second portion 156 of the air 150 flowing through the HP compressor 124. This provides compressed air 158 to the combustion section 126 where it mixes with fuel and burns to provide combustion gases 160.

The combustion gases 160 flow through the HP turbine 128 where one or more sequential stages of HP turbine stator vanes 166 and HP turbine rotor blades 168 coupled to the HP shaft 134 extract a first portion of kinetic and/or thermal energy therefrom. This energy extraction supports operation of the HP compressor 124. The combustion gases 160 then flow through the LP turbine 130 where one or more sequential stages of LP turbine stator vanes 162 and LP turbine rotor blades 164 coupled to the LP shaft 136 extract a second portion of thermal and/or kinetic energy therefrom. This energy extraction causes the LP shaft 136 to rotate, thereby supporting operation of the LP compressor 122 and/or rotation of the fan shaft 138. The combustion gases 160 then exit the core turbine 114 through the exhaust section 132 thereof. A turbine frame with a fairing assembly 161 is located between the HP turbine 128 and the LP turbine 130. The turbine frame 161 acts as a supporting structure, connecting a high-pressure shaft's rear bearing with the turbine housing and forming an aerodynamic transition duct between the HP turbine 128 and the LP turbine 130. Fairings form a flow path between the high-pressure and low-pressure turbines and can be formed using metallic castings (e.g., nickel-based cast metallic alloys, etc.).

Along with the turbofan 110, the core turbine 114 serves a similar purpose and is exposed to a similar environment in land-based gas turbines, turbojet engines in which the ratio of the first portion 154 of the air 150 to the second portion 156 of the air 150 is less than that of a turbofan, and unducted fan engines in which the fan section 116 is devoid of the nacelle 142. In each of the turbofan, turbojet, and unducted engines, a speed reduction device (e.g., the reduction gearbox 139) can be included between any shafts and spools. For example, the reduction gearbox 139 is disposed between the LP shaft 136 and the fan shaft 138 of the fan section 116.

Figure 2:
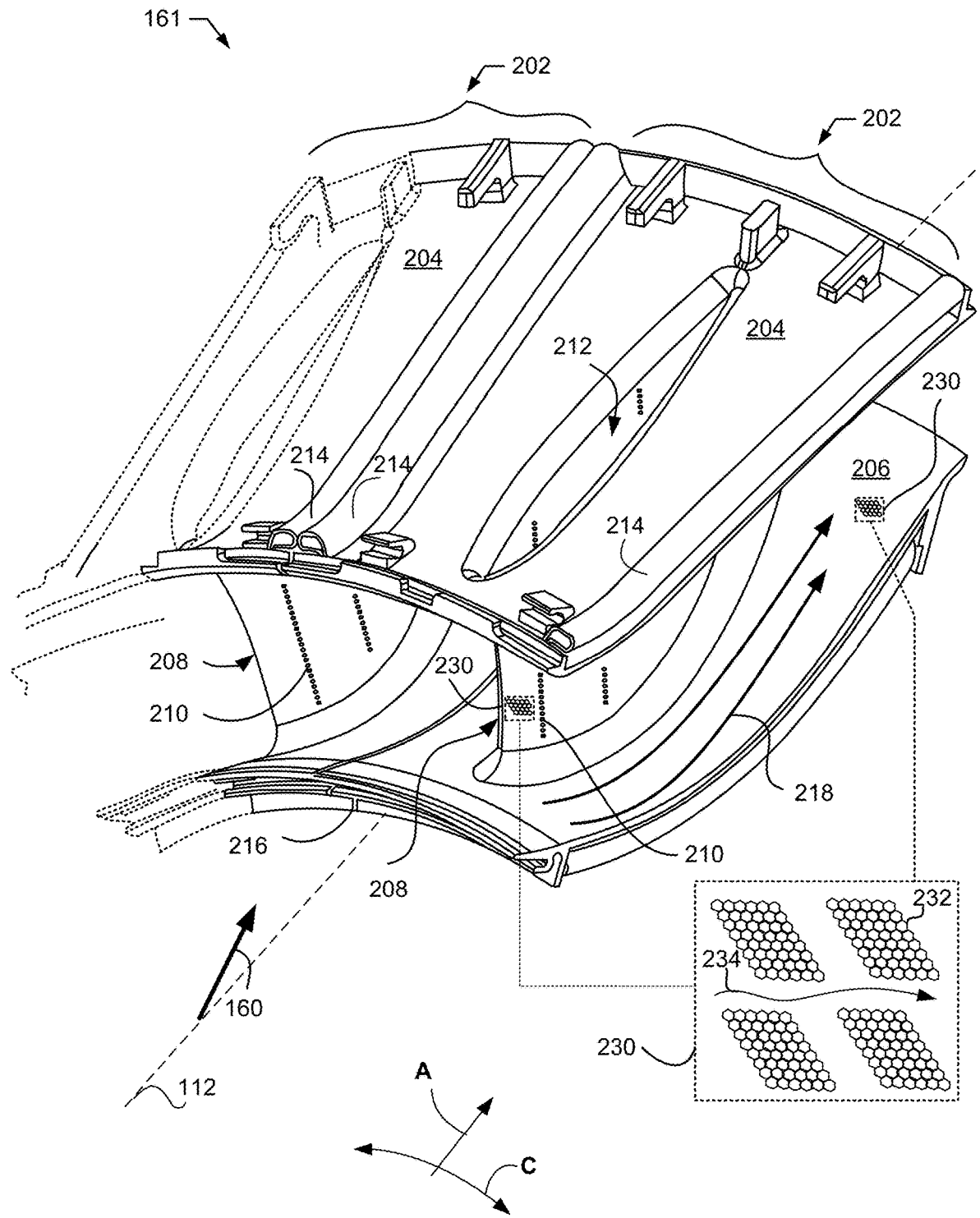
FIG. 2 illustrates an example upper perspective view of a partial turbine frame fairing assembly that can be utilized within the example gas turbine engine of FIG. 1.

FIG. 2 illustrates, in greater detail, an example upper perspective view of a partial turbine frame fairing assembly 161 that can be utilized within the gas turbine engine of FIG. 1. The turbine frame fairing assembly 161 includes flow path hardware components (e.g., vanes) used to cool the fairing assembly 161 during gas turbine engine 101 operation. As depicted therein, the turbine frame assembly 161 defines an axial direction A and a circumferential direction C. In general, the axial direction A extends generally parallel to the longitudinal axis 112, and the circumferential direction C extends concentrically around the longitudinal axis 112.

The fairing assembly 161 is located between the HP turbine 128 and the LP turbine 130 (e.g., positioned between a high pressure spool and a low pressure spool), providing a flow path 218 between the turbines that allows for passage of the hot combustion gases 160 originating from the HP turbine 128. The fairing assembly 161 extends circumferentially about the engine centerline axis 112. In the example of FIG. 2, the fairing assembly 161 includes example fairing(s) 202. Fairing(s) 202 include an outer band 204 and an inner band 206, with vane(s) 208 positioned in between the outer band 204 and the inner band 206. The outer band 204 and the inner band 206 have circumferential lengths at a forward end of the fairing 202 that are less than their circumferential lengths at an aft end of the fairing 202, while the outer band 204 has a circumferential lengths at the aft end of the fairing 202 and the forward end of the fairing 202 that are greater than the circumferential lengths of the inner band 206 at the aft and forward ends of the fairing 202. The outer band 204 includes edges 214 formed to create a seal between each of the fairings 202 that are part of the fairing assembly 161, as described in more detail in association with FIGS. 12A-12D. The edges 214 of the outer band extend between the forward end and the aft end of the fairing 202. In some examples, the edges are formed in the shape of a hair-pin structure, as shown in FIG. 2. The inner band(s) 206 of the fairing(s) 202 are also positioned together to create a seal 216 (e.g., using the hair-pin structure-shaped edges 214). As such, the adjacent fairing(s) 202 can be connected using the edges 214 to form a continuing, circumferentially extending structure that forms the fairing assembly 161.

The vane(s) 208 positioned between the outer band 204 and the inner band 206 can have the shape of an airfoil, thereby forming a leading edge (e.g., at the forward end of the fairing 202) and a trailing edge (e.g., at the aft end of the fairing 202), as described in more detail in association with FIGS. 8 and 10. The vane(s) 208 can have a hollow, airfoil-shaped hollow interior 212 to allow for positioning of a strut within the fairing 202, as shown and described in connection with FIG. 9. In FIG. 1, the hollow vane 208 can have a double-walled structure, as described in connection with FIG. 6.

The double-walled structure of vane 208 includes openings 210 for passage of cooling air flow to cool the fairing 202. In some examples, the fairing(s) 202 can be uncooled, depending on the intended operating temperatures and/or the materials selected for use in fairing assembly 161. However, given high operating temperatures in excess of 1,000 degrees Celsius, the fairing assembly 161 should have high temperature capability and a low coefficient of thermal expansion, using materials that are able to withstand higher operating temperatures within the engine to allow for higher engine efficiency. As such, in some examples in which the fairing(s) 202 are cooled, the fairing vane(s) 208 include openings 210 for passage of cooling air flow from the outer band 204 to the airfoil of the fairing 202 formed by the vane 208 (e.g., with a leading edge and a trailing edge). Given the high temperatures of the hot combustion gas flow path 218 passing between the vane(s) 208 of the fairing(s) 202, the presence of cooling air provided via the vane openings 210 reduces the temperature, allowing use of lower grade materials for the flow path hardware (e.g., fairings 202) and/or use of higher flow path temperatures (e.g., higher operating temperatures).

In some examples, the thickness of the fairing 202 of FIG. 2 can range from 40-110 mil (e.g., 0.04-0.1 inches) and the vane openings 210 can be 15-45 mil in size (e.g., 0.015-0.045 inches in diameter) for providing cooling air to the vane and/or the rest of the fairing (e.g., between the outer band 204 and the inner band 206 of the fairing 202). However, any opening diameter, size, and/or layout can be used in order to effectively increase cooling of the turbine frame and/or any turbine frame component while reducing the amount of cooling flow needed to, for example, improve a specific fuel consumption (SFC).

In some examples, the openings 210 can be positioned circumferentially along the vane(s) 208 and have a varying number of openings 210 on each column of aligned openings (e.g., a column of openings having a total of 20 openings aligned vertically together, with the number of openings in the column depending on the height of the vane 208 in a given location). The number of vane openings 210 can vary depending on the total intended bulk temperature reduction (e.g., intended rate of cooling) as a result of the opening(s) 210 providing cooling air to the fairing 202. The fairing 202 can be formed using a single-piece design, such that the fairing is not segmented and/or split.

In FIG. 2, the fairing 202 structure (e.g., outer band 204, inner band 206, and/or vane 208) can include a lattice structure 230. Cooling flow 234 along the lattice structure area(s) 232 can be used to control the bulk flow path hardware temperature. The lattice structure area 232 layout (e.g., lattice structure orientation) can be determined based on the structure that permits increased rate of heat transfer, higher load carrying capacity, increased access to cooling flow, and lower weight of the fairing structure. Design of the lattice structure 230 can be optimized or otherwise improved by designing the lattice structure 230 to permit increasing a heat transfer coefficient (e.g., increasing the surface area to increase heat transfer rate), reduce pressure drops (e.g., forming a smooth passage for cooling flow 234), reduce a weight of the fairing structure (e.g., higher void structure), and/or increase strength (e.g., lattice positioned close enough to provide higher strength to take various loads). Additionally, the lattice structure can also be designed to reduce vibrations that can lead to increased fatigue damage of the engine components. The lattice geometry can vary depending on the design specifications, and is not limited to the geometry presented in the example of FIG. 2. The lattice structure 230 can be formed using additive manufacturing and/or any other method for flow path hardware manufacturing.

Figure 3:
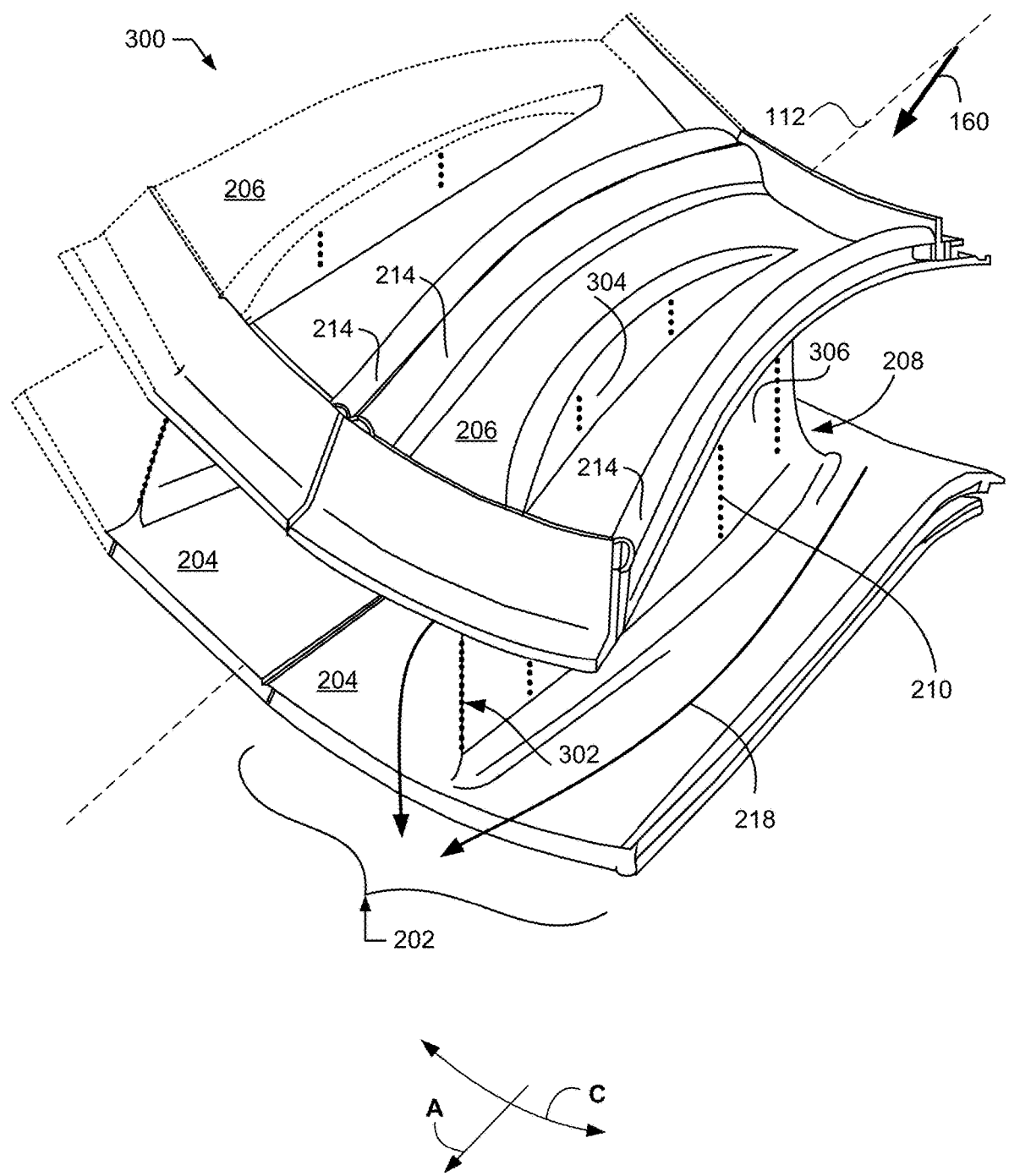
FIG. 3 illustrates an example lower perspective view of a partial turbine frame fairing assembly that can be utilized within the example gas turbine engine of FIG. 1.

FIG. 3 illustrates an example lower perspective view 300 of a partial turbine frame fairing assembly 161 that can be utilized within the gas turbine engine of FIG. 1. The lower perspective view 300 illustrates hot air flow as it passes the outer edges of the vane(s) 208, with the vane(s) 208 narrowing along the centerline axis 112. In the fairing assembly 161 of FIG. 3, the outer band 204 and inner band 206 of the fairing 202 are shown in alternate view from those of FIG. 2, with the inner band 206 shown in more detail. The hot air flow 218 originating from the HP turbine 128 once the combustion gases 160 pass through a combustor is shown passing from the leading edge to the trailing edge of the vane(s) 208 of FIG. 2. As in FIG. 2, the vane openings 210 are shown positioned circumferentially around the vane(s) 208, with the openings seen on an inside surface 304 and an outside surface 306 (e.g., a first surface 304 and a second surface 306) of the hollow double-walled vane(s) 208. In FIG. 3, the openings are also distinctly positioned on the trailing edge of the vane 208, forming a column of vertically aligned openings 302 on the very tip of the trailing edge of the vane 208 structure, as shown in more detail using an alternate view of FIG. 4. The trailing edge aligned vertical openings 302 can be used to provide additional cooling to the fairing 202, such that there is an evenly distributed flow of cool air throughout the fairing 202, resulting in a reduction of thermal gradients. For example, temperature gradients can occur over very short distances, producing high thermal stresses and changing the overall dimensions of the turbine frame structures and flow path hardware (e.g., fairing, strut, etc.), such that the structures can expand and/or contract in response to the changes in temperature (e.g., thermal-induced growth of the fairing materials can occur as they reach normal operating temperature, with temperatures reaching over 1000 degrees Celsius in the combustor and turbine sections). Therefore, design of the fairing structure is to consider not only performance criteria (e.g., strength, fatigue capability, etc.), but also overall cost as well as weight (e.g., in aerospace applications). Fairing 202 material selection can depend on factors that allow for control of thermal expansion (e.g., thermally-induced material expansion) for improved engine 102 performance (e.g., low coefficient of thermal expansion). However, such conditions are restrictive to fairing 202 material selection. Cooling of the fairing(s) 202, as disclosed herein, can allow use of lower grade materials that are otherwise not applicable due to the high temperatures and/or presence of thermal gradient formation in the turbine frame. Moreover, use of higher-grade materials for the fairing assembly 161 that already withstand high operating temperatures can permit operation at even higher temperatures in the presence of a flow path hardware-based cooling system (e.g., cooling of fairing(s) 202). Additionally, the edges 214 used to form the seal between each of the adjacent fairing(s) 202 can be designed to further reduce thermal gradients and account for thermal-induced expansion at operating temperatures, as described in more detail in association with FIGS. 12A-12D.

Figure 4:
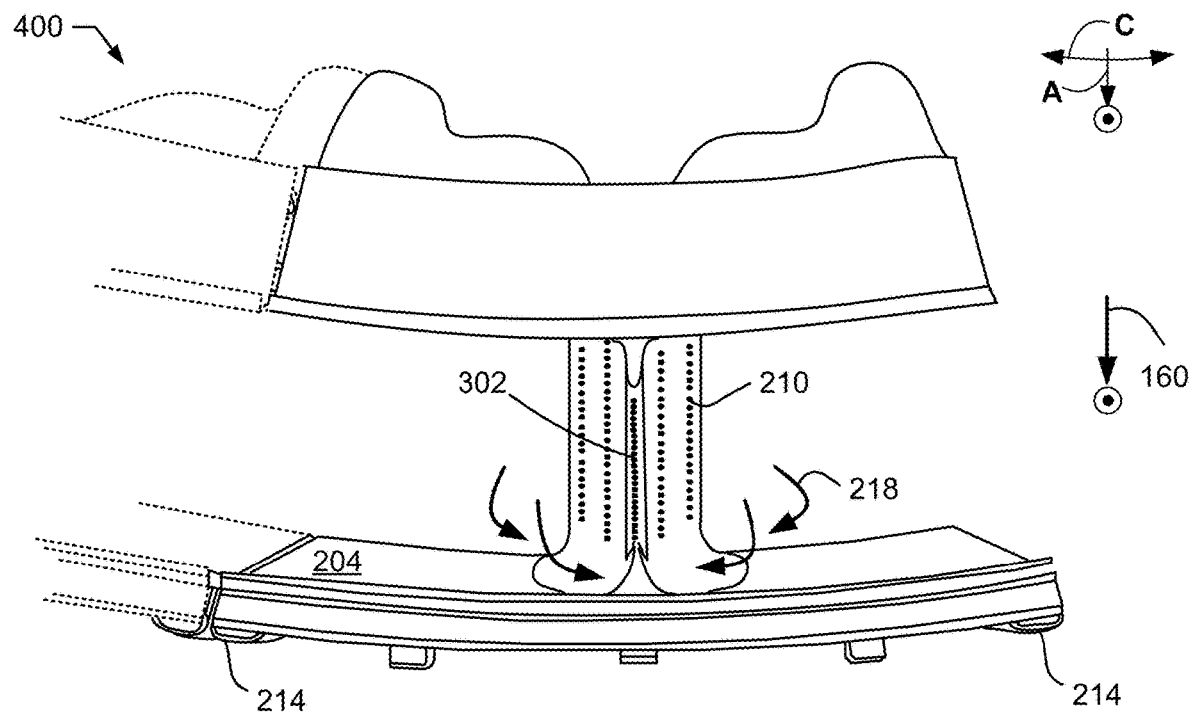
FIG. 4 illustrates an example side view of the lower perspective view of the partial turbine frame fairing assembly of FIG. 3.

FIG. 4 illustrates an example side view 400 of the lower perspective view 300 of the partial turbine frame fairing assembly of FIG. 3. The side view 400 of FIG. 3 indicates that the hot air flow 218 originating from the HP turbine 128 passes from the forward end of the outer band 204 to the aft end of the outer band 204 of the fairing 202 of FIGS. 2-3, with the direction of the flow of combustion gases 160 indicating the positioning of the partial fairing assembly side view 400 of FIG. 4. Curved edges 214 of the outer band 204 are shown adjacent to another fairing, thereby forming a partial fairing assembly 161. The column of vertically aligned openings 302 of FIG. 3 of the vane 208 of FIGS. 2-3 is shown in FIG. 4 to be positioned on the tip of the trailing edge of the vane 208. This provides an alternate view of the openings 210 included on the outer surface 306 of the vane 208 to illustrate where cooling air from the outer band 204 entering the hollow vane 208 can exit in order to cool the fairing 202. The column of openings 302 can be excluded from the vane 208 design, instead including only the remaining openings 210 shown to be circumferentially surrounding the vane 208. In some examples, only the column of openings 302 on the trailing edge of the vane 208 can be included as part of the fairing cooling system design. A total number of openings used in the column of vertically aligned openings 302 and/or the remaining columns of openings 210 can be determined based on a bulk temperature reduction of the fairing assembly 161. The openings 210 and/or 302 may be arranged in any other way and/or positioned in any part of the vane in a symmetrical or asymmetrical manner and are not limited to a specific arrangement.

Figure 5:
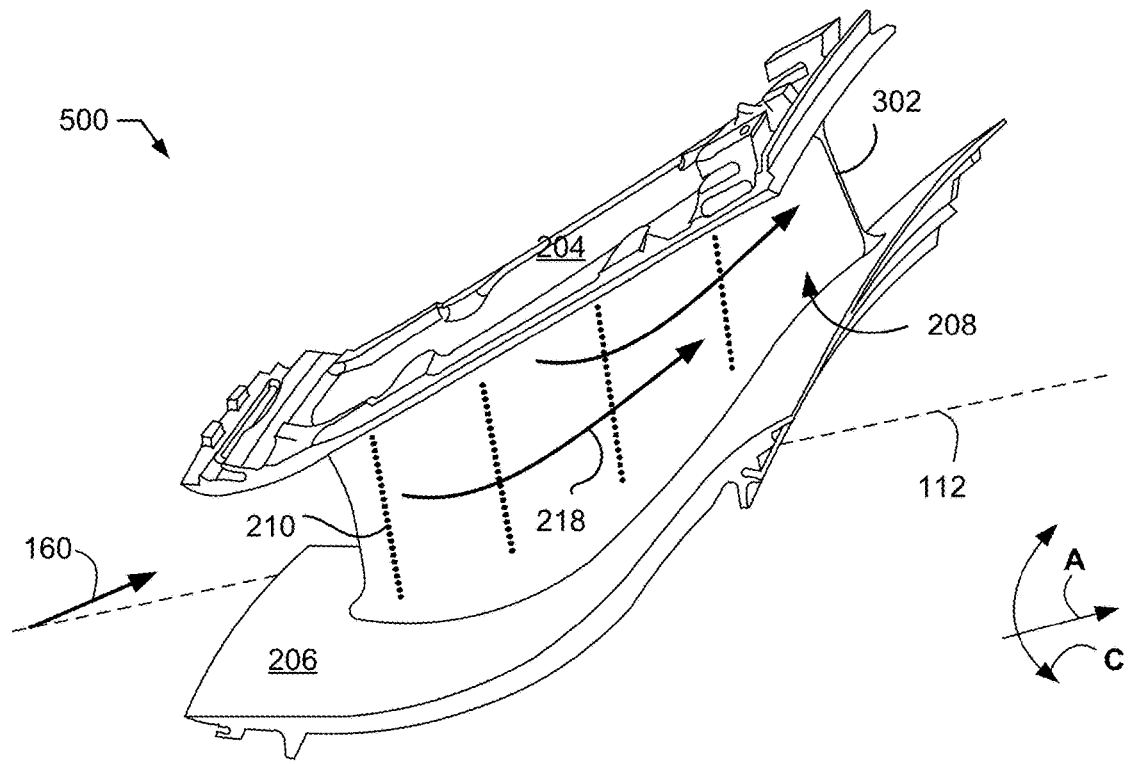
FIG. 5 illustrates an example side view of the upper perspective view of the partial turbine frame fairing assembly of FIG. 2.

FIG. 5 illustrates a side view 500 of the upper perspective view of the partial turbine frame fairing assembly 161 of FIG. 2. The side view 500 of the fairing assembly 161 provides a view of the openings 210 as positioned on the outside surface 306 of the vane 208, such that the number of openings 210 can be adjusted to account for the narrowing of the outside surface 306 along the centerline axis 112. The outer band 204 and the inner band 206 are positioned between the vane 208. Openings 210 and/or 302 permit cooling air flow to enter the fairing airfoil from the outer band 204 via the openings where hot air flow 218 from the HP turbine 128 is passing through the fairing 202, as previously described. In FIG. 5, the vane openings 210 positioned circumferentially around the vane 208 are arranged in a total of four columns on each side of the outer surface 306 of the vane wall, with a single column of openings 302 on the trailing edge of the airfoil. However, any number of columns and/or arrangement of the openings on the outer surface 306 of the vane 208 can be used, based on the final intended bulk temperature reduction. The geometry of the openings 210 and/or 302 can be any geometry determined to improve fairing cooling performance, such as reduction of hot mainstream ingestion (e.g., laterally-and-forward expanded holes, flared holes, variation of length-to-dimeter ratio of the holes, etc.). The spacing of the openings 210 and/or 302 can be of any spacing (e.g., small hole spacing can result in better coverage of the vane 208, with higher effectiveness values compared to larger holes).

Figure 6:
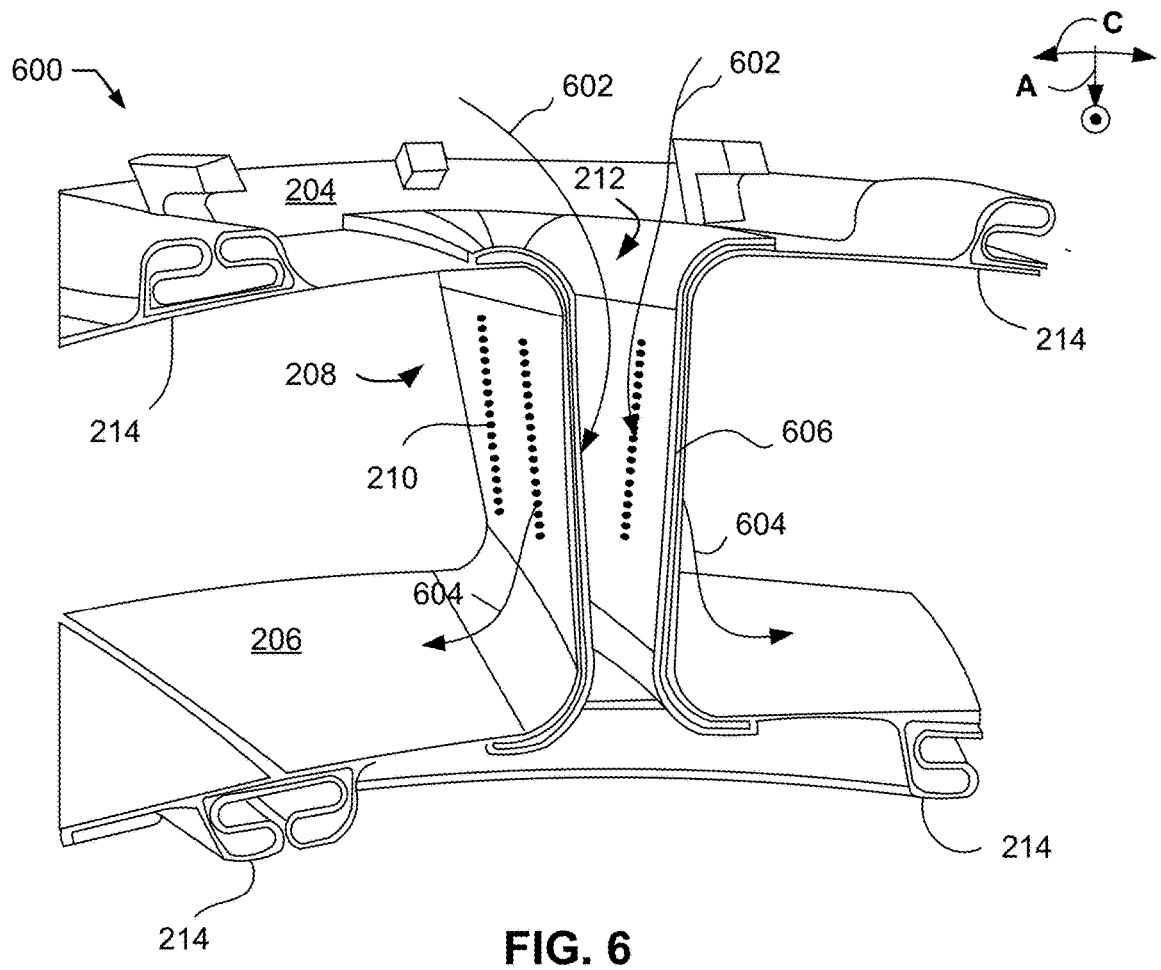
FIG. 6 illustrates an example cross-sectional double-walled fairing view of the upper perspective view of the partial turbine frame fairing assembly of FIG. 2.

FIG. 6 illustrates a cross-sectional double-walled fairing view 600 of the upper perspective view of the partial turbine frame fairing assembly 161 of FIG. 2. The vane 208 is shown connecting the outer band 204 to the inner band 206, with fairings 202 of the partial fairing assembly 161 attached at the curved edges 214. A cooling air flow 602 from the outer band 204 (indicated by arrows in FIG. 6) enters the hollow structure 212 of the vane 208. The cooling air flow 602 is shown entering the inside vane surface 304 where openings 210 are located to create an air flow 604 conduit between the double-walled vane 208 and the fairing 202 airfoil (as shown by arrows in FIG. 6), such that the cooling air 604 passes through the double-walled vane 208, exiting at the outer vane surface 306 through the openings 210. The cooling air flow 602 can originate from a source such as the compressor. Cooling air 604 exiting from the openings in the vane 208 creates a type of film cooling, resulting in a thin layer of cool air on the fairing airfoil surface. For example, cold air can be injected into the hot gas flow through the vane openings 210, protecting the fairing airfoil metal by cooling its surface. Furthermore, given the double-walled structure of the vane 208, the cooling air 602 enters the double-wall 606 through the inner vane wall surface 304 (FIG. 3) openings and dissipates throughout the double-wall 606 structure, in addition to exiting through the openings 210 on the outer vane surface 306. This permits the vane 208 walls to be cooled in addition to the wall openings 210 providing additional film cooling through the cool air exiting directly out of the vane openings 210. As such, the high temperatures to which the fairing assembly 161 materials are exposed can be reduced (e.g., bulk temperature reduction) and the materials better protected (e.g., reducing high temperature-induced material changes).

Figure 7:
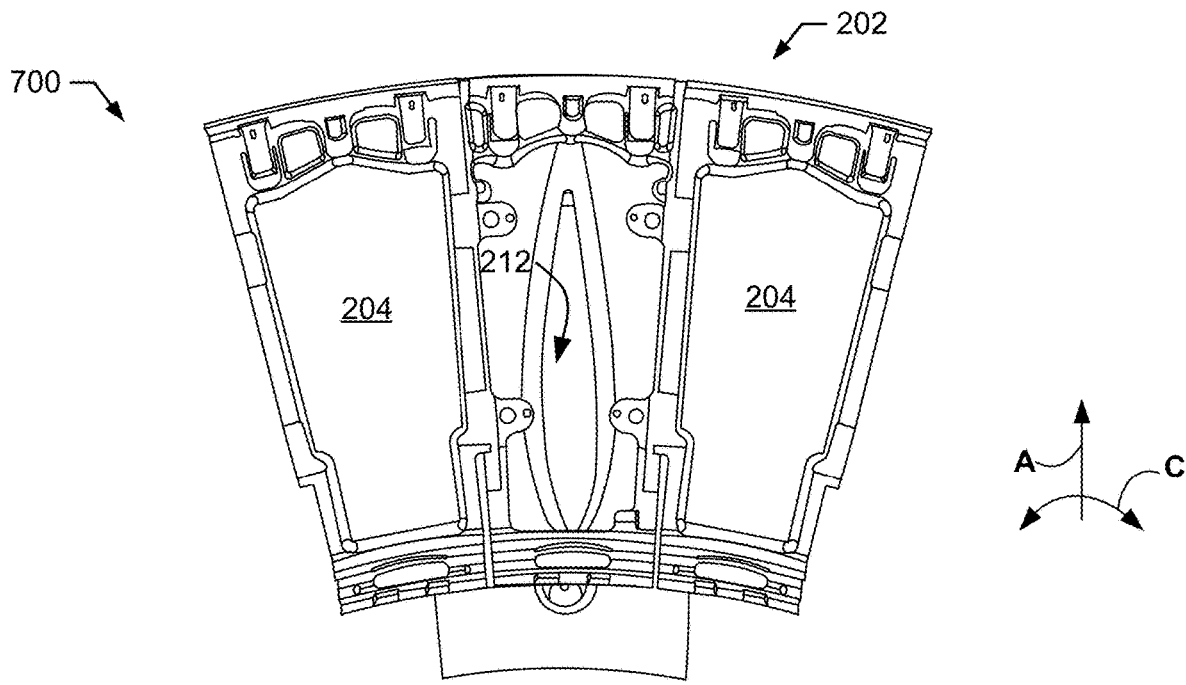
FIG. 7 illustrates a top view of the upper perspective view of the partial turbine frame fairing assembly of FIG. 2.

FIG. 7 illustrates a top view 700 of the upper perspective view of the partial turbine frame fairing assembly 161 of FIG. 2. FIG. 7 shows the outer band 204 of the fairing 202, with the hollow interior 212 of the vane 208. FIG. 7 is used to illustrate fairing cooling air flow at the leading edge and trailing edge of the fairing airfoil, as described in more detail below in association with FIGS. 8A-8C and FIGS. 10A-10B.

Figure 8A:
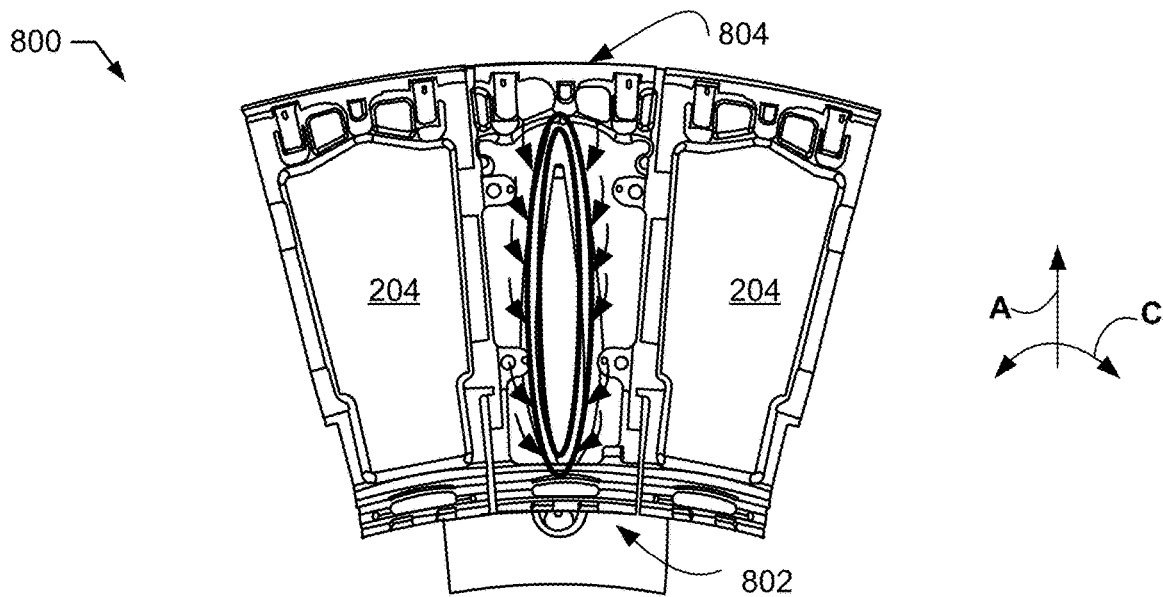
FIG. 8A illustrates fairing cooling using air flow from an outer band cavity of the partial turbine frame fairing assembly of FIG. 2.
Figure 8B:
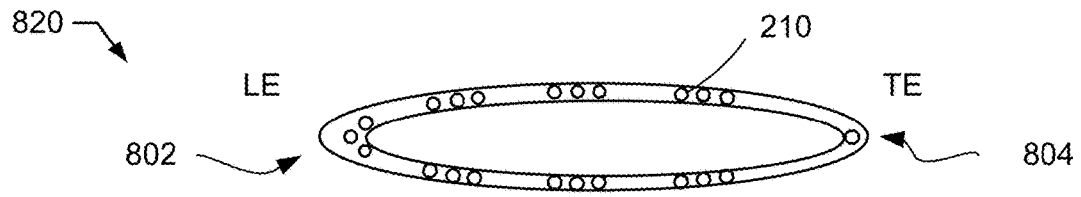
FIG. 8B illustrates positioning of flow path openings in the fairing of FIG. 8A to allow entry of cooling air flow into the double-walled frame fairing of FIG. 6.
Figure 8C:
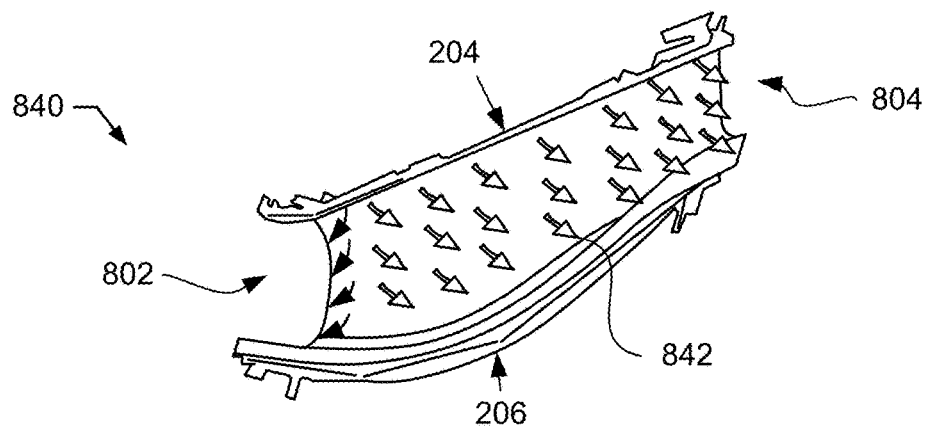
FIG. 8C illustrates release of cooling air flow from flow path side openings of the double-walled fairing of FIG. 6.

FIGS. 8A-8C depict example fairing cooling 800 using flow path openings in the double-walled vane 208 of the fairing assembly 161 of FIG. 2. FIG. 8A illustrates fairing cooling 800 using air flow from an outer band cavity of the partial turbine frame fairing assembly 161. In FIG. 8A, the outer band 204 is shown surrounding the hollow opening of the vane 208, with a leading edge 802 and a trailing edge 804 indicating the position of the fairing airfoil with respect to the flow of hot air originating from the HP turbine 128 of FIG. 1. As such, the arrows illustrated in FIG. 8A correspond to the entry of cooling airflow (e.g., originating from a compressor) from the outer band 204 to the hollow, double-walled vane 208.

FIG. 8B further illustrates positioning 820 of flow path openings in the fairing of FIG. 8A to allow entry of cooling air flow into the double-walled frame fairing of FIG. 6. Openings 210 are embedded within the double-walled vane 208, with openings located throughout the entire circumference of the vane 208, including at the leading edge (LE) 802 and/or the trailing edge (TE) 804 (e.g., column of openings 302 of FIG. 3). For example, the inner ellipse corresponds to the inner vane wall surface 304 (e.g., exposed to cooling air flow from a bore) while the outer ellipse corresponds to the outer vane wall surface 306 (e.g., exposed to hot air flow from HP turbine 128). As such, the example arrangement of the openings 210 allowing cooling air to enter the double-walled vane 208 (e.g., at the inner vane wall surface 304) from the outer band 204 cavity permits the cooling air to then be released from the side openings of the outer vane surface 306 to the hot air flow path surrounding the fairing airfoil.

FIG. 8C illustrates release 840 of cooling air flow from flow path side openings of the double-walled fairing of FIG. 6. The leading edge 802 and the trailing edge 804 are shown relative to the outer band 204 and the inner band 206. The cooling airflow 842 is shown exiting the outer vane surface 306 at the openings 210, in addition to openings located on the leading edge 802 and/or the trailing edge 804. As such, the cooling airflow 842 exits at all sides of the outer vane surface 306, promoting the cooling of the fairing airfoil and reducing the bulk temperature. The outer band 204 can provide a cooling air flow pressure of 48-145 psia, while the hot air flow pressure at the fairing airfoil can be at 46-138 psi. In some examples, the vane opening 210 diameter can be 0.015-0.045 inches, with a total of 35-105 openings (e.g., holes) positioned throughout the vane (e.g., outer vane surface and/or inner vane surface). Using these parameters, when the cooling flow is at 0.012-0.038% W25 (e.g., W25 corresponding to the physical core airflow at the core inlet), with a 1B 12 strut at 0.15-0.45% W25, the total bulk temperature reduction can be 75-225 degrees Fahrenheit. Therefore, better temperature control is achieved through the presence of the openings 210, reducing thermal stresses and keeping a low temperature gradient in order to avoid fatigue of fairing materials and other flow path hardware components (e.g., maintaining an even temperature distribution and avoiding heat-induced material deformation/expansion).

Figure 9:
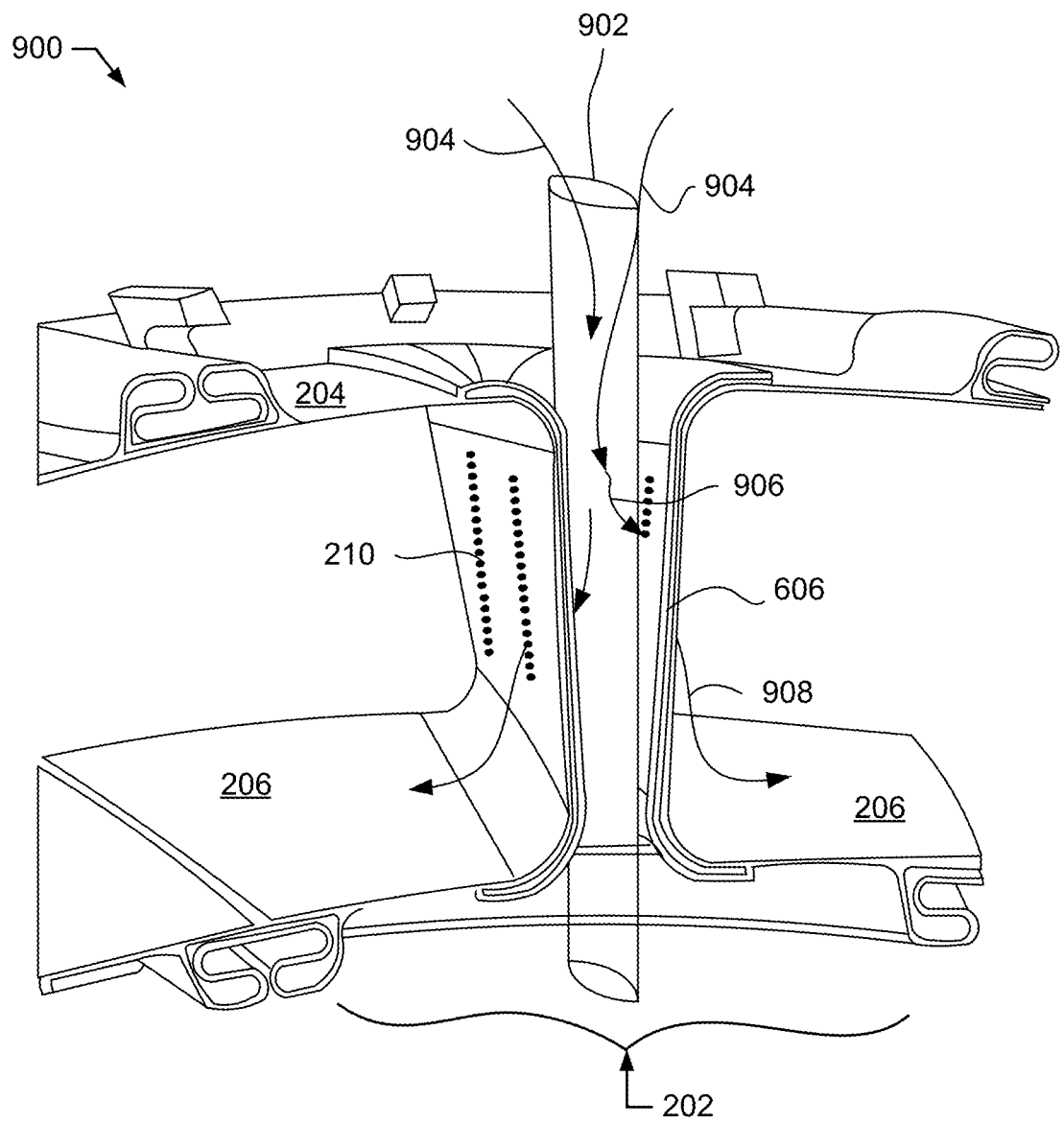
FIG. 9 illustrates an example cross-sectional double-walled fairing view of the upper perspective view of the partial turbine frame fairing assembly of FIG. 2, including a strut positioned within the fairing.

FIG. 9 illustrates a cross-sectional double-walled fairing view 900 of the upper perspective view of the partial turbine frame fairing assembly 161 of FIG. 2, including a strut positioned within the fairing. In FIG. 9, a metallic strut 902 extends through the hollow interior of the fairing vane (e.g., passing through the outer band 204 to the inner band 206). The strut 902 transfers load from the fairing assembly 202 hub and can be solid, hollow, or partially hollow. In FIG. 9, the strut 902 is hollow, providing cooling air flow 904 to the fairing airfoil through the opening(s) 210 of the fairing double-walls 606. The fairing hollow structure 212 protects the strut 902 from hot gases. The fairing 202 can be formed using materials that have a low coefficient of thermal expansion (e.g., ceramic matrix composite (CMC)-based material, etc.), such that the rate of thermal expansion of the fairing can be different from that of the metal strut 902 (e.g., formed using nickel-based alloys, etc.). In FIG. 9, the cooling air flow 904 moving through the strut 902 can exit the strut 902 and enter the double-walled vane 208, providing air flow 906 to the inner vane surface 304 and filling the double-wall with cooling air and/or further providing cooling air flow 908 that exits the outer vane surface 306 at openings 210. The strut 902 also has openings (e.g., holes) at its top sides to release air to pressurize the outer band 204 cavity. As such, cooling air can be drawn by the strut 902 from the outer band 204 cavity via holes available on the strut surface, with additional holes provided towards the middle of the strut 902 to release cooling air for passage to the fairing (e.g., via openings 210), as described in more detail in connection with FIG. 10B. For example, the strut can include a strut baffle pieced with impingement cooling holes, providing impingement cooling of the fairing 202, described in connection with FIGS. 10B and 11. Cooling air from a source such as a compressor can be fed through the strut 902, with a portion of the air passing all the way through the strut, and a portion of the air entering the double-walled vane 208. The air can exit the struts through passages on the strut 902 sides and enter the strut baffles. A portion of the flow then exits impingement cooling openings in the strut baffle to be used for impingement cooling of the fairing 202. In some examples, air from the outer band 204 cavity can be a combination of purge air and post-impingement air flow.

Figure 10A:
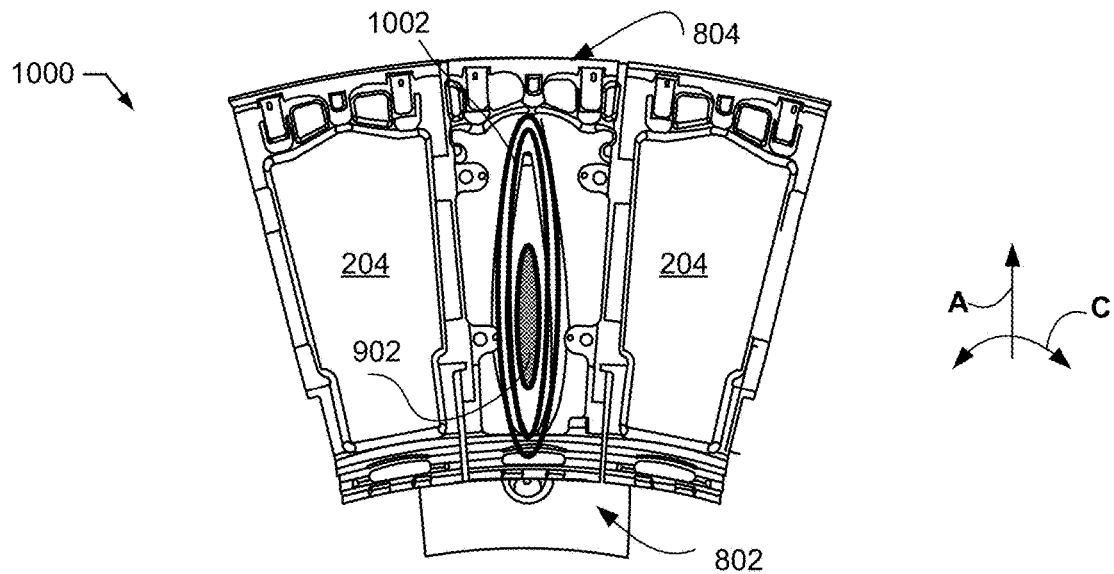
FIG. 10A illustrates a fairing cooling configuration using air flow from the strut positioned within the fairing of FIG. 9.

FIG. 10A illustrates an example configuration for fairing cooling 1000 using air flow from the strut positioned within the fairing 202 of FIG. 9. In FIG. 10A, an upper view of the strut 902 is shown positioned at the outer band 204, with the leading edge 802 and the trailing edge 804 positioned at the forward end of the fairing 202 and the aft end of the fairing 202, respectively, with an outline 1002 of the double-walled vane 208 shown for reference in connection with the cooling air flow description associated with FIG. 10B.

Figure 10B:
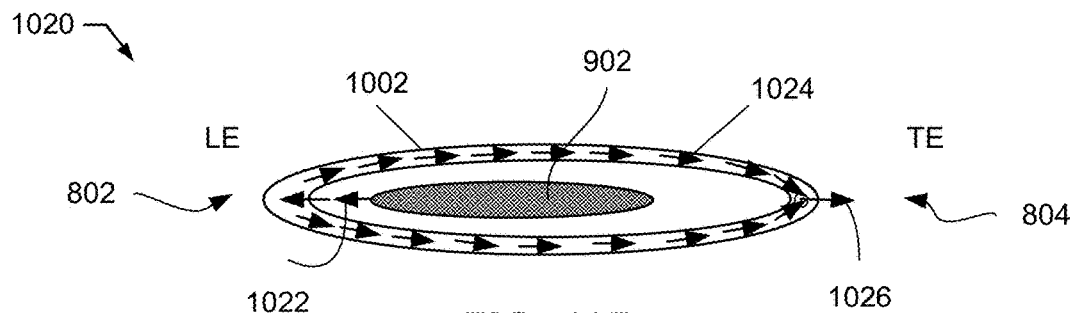
FIG. 10B illustrates cooling flow entering the double-walled fairing from the strut positioned within the fairing of FIG. 9.

FIG. 10B illustrates an example cooling flow 1020 entering the double-walled fairing 202 from the strut 902 (e.g., shown as a top view of the strut in FIG. 10B) positioned within the fairing 202 of FIG. 9. In FIG. 10B, a cooling air flow 1022 enters the double-wall 606 of the fairing at the inner vane surface 304 from a hole located at the strut 902 outer surface, as shown by example air flow 1022 exiting the strut surface and entering the double-wall 606 at the leading edge 802 of the fairing airfoil. Based on a pressure provided, the air flow 1024 can travel from the leading edge 802 to the trailing edge 804 of the double-wall 606, providing a cooling air flow 1026 that exits the double-wall 606 at the trailing edge 804 via the column of aligned vertical openings 302 of FIG. 3. For example, the air flow pressure inside the strut 902 can be at 62-186 pounds per square inch absolute (psia), and the flow path at the fairing 202 airfoil can be at 46-138 psia. If the strut hole diameter (e.g., hole where air flow 1022 exits the strut) is 0.25-0.75 inches, with a fairing opening 210 diameter of 0.015-0.045 inches, a total opening 210 count of 15-45, a cooling flow of 0.15-0.45% W25, with a 1B 12 strut at 0.15-0.45% W25, the total bulk temperature reduction can be at 100-300 degrees Fahrenheit. As such, parameters such as the opening 210 diameter, the opening 210 count, and strut 902 hole diameter, which releases the cooling air into the double-wall 606, can be modified and/or varied to achieve a specific bulk temperature reduction based on given air flow pressures.

Figure 11:
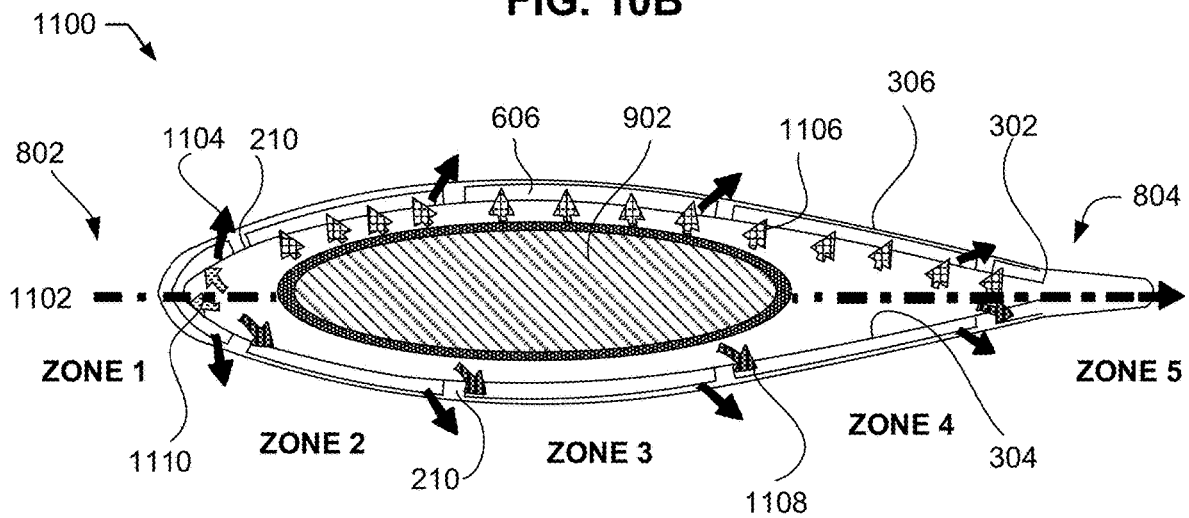
FIG. 11 illustrates flow of cooling air used to cool the fairing of FIG. 9, including impingement cooling, bore cooling, and/or film cooling.

FIG. 11 illustrates a flow 1100 of cooling air used to cool the fairing of FIG. 9, including impingement cooling, bore cooling, and/or film cooling. The flow 1100 of cooling air allows for use of multiple cooling flow paths to reduce high operating temperatures present in the fairing assembly 161 during engine operation. As previously described, film cooling occurs when the cooling air exiting from the openings in the vane 208 results in a thin layer of cool air on the fairing airfoil surface. For example, cold air can be injected into the hot gas flow through the vane openings 210, protecting the fairing airfoil metal by cooling its surface. In FIG. 11, the hotter high pressure turbine-derived air enters the fairing at the leading edge 802 of the fairing airfoil (e.g., air-foil shaped vane 208), undergoes cooling as a result of the cooling process described herein, and exits or leaves at the trailing edge 804. In FIG. 11, the strut 902 is positioned within the fairing (e.g., hollow structure of vane 208).

For ease of reference, FIG. 11 is subdivided into cooling zones (e.g., zones 1-5) along the axis 1102, with zone 1 at the leading edge 802 and zone 5 at the trailing edge 804 of the fairing airfoil. Cooling of the fairing in zone 1 includes an impingement cooling air flow 1110 at the leading edge 802, as described in connection with FIG. 10B (e.g., the cooling air flow 1022 originating from the strut 902 hole). The impingement cooling flow 1110 is used at the leading edge 802, given that this is the hottest region in the fairing 202 (e.g., hot air flow originating from HP turbine 128 of FIG. 1). Likewise, the hot air flow path 218 at the leading edge 802 has a high pressure, such that cooling air flow with a lower air pressure is not released. Unlike film cooling, also present in zone 1 as a result of the cooling air flow 1104 exiting vane opening(s) 210 to cool the outer vane surface 306, impingement cooling is an internal type of cooling (e.g., cooling of the inner vane surface 304). Cooling of the inner vane surface 304 in addition to the outer vane surface 306 reduces the bulk temperature of the fairing assembly 161 by improving cooling air circulation, thereby lowering temperatures at the vane surfaces in contact with flow of hot combustion gases 160.

In FIG. 11, the cooling air used to cool the fairing 202 of FIG. 2 can originate from a compressor. The cooling air also can originate from a bore tube assembly (e.g., bore cooling) that supplies cooling steam to the hot gas components and returns the spent cooling steam (e.g., recycling the cooling air). Therefore, zone 1 can include the impingement cooling flow 1110, a film cooling flow 1104, and/or a bore cooling flow 1108, while zones 2-5 can include the film cooling flow 1104, the bore cooling flow 1108, and/or an impingement baffle-based cooling flow 1106. In zones 2-5, the cooling air flow 1108 from the outer band 204 and/or the strut 902 can enter the double-wall 606 of the vane, providing cooling within the double-wall 606 while also allowing for the cooling air to exit through openings 210 (e.g., the film cooling flow 1104). Zones 2-5 also include the impingement baffle-based cooling flow 1106. For example, the strut 902 can include a strut baffle pieced with impingement cooling holes, providing impingement cooling of the fairing 202. Cooling air from a source such as a compressor (e.g., the HP compressor 124) can be fed through the strut 902, with a portion of the air passing all the way through the strut 902, and a portion of the air entering the double-wall 606. The air can exit the struts 902 through passages on the strut 902 sides and enter the strut baffles. A portion of the flow then exits impingement cooling openings in the strut baffle to be used for impingement baffle-based cooling flow 1106. The impingement baffle-based cooling flow 1106 can enter the double-wall 606 to cool the fairing (e.g., backside cooling). In zone 5 at the tailing edge 804, a column of vertically oriented openings 302 of FIG. 3 can be included to permit cooling air flow release to the flow path along the fairing airfoil, in order to fill any flow wakes (e.g., regions of disturbed flow downstream of the airfoil trailing edges) and reduce aerodynamic loss (e.g., maintain turbine aerodynamic efficiency despite reduction of fairing assembly 161 vane surface temperatures).

The cooling zones (e.g., zones 1-5 of FIG. 11) disclosed and described herein are intended as examples and do not limit application to the cooling zone(s) and/or cooling methods (e.g., impingement cooling, film cooling, etc.) disclosed and described herein. The methods and apparatus disclosed herein for gas turbine frame flow path hardware cooling can be changed based on the design of the frame components (e.g., vane opening diameters, layout, and/or size, etc.) and the cooling requirements of the hardware.

Figure 12A:
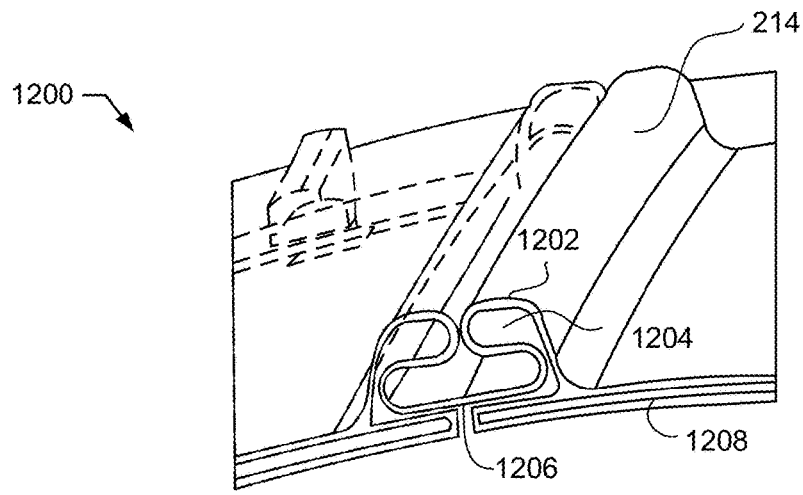
FIG. 12A illustrates end segments of a spring seal used to form seals in the illustrated turbine frame fairing assemblies of FIGS. 2-4, FIG. 6, and FIG. 9.
Figure 12D:
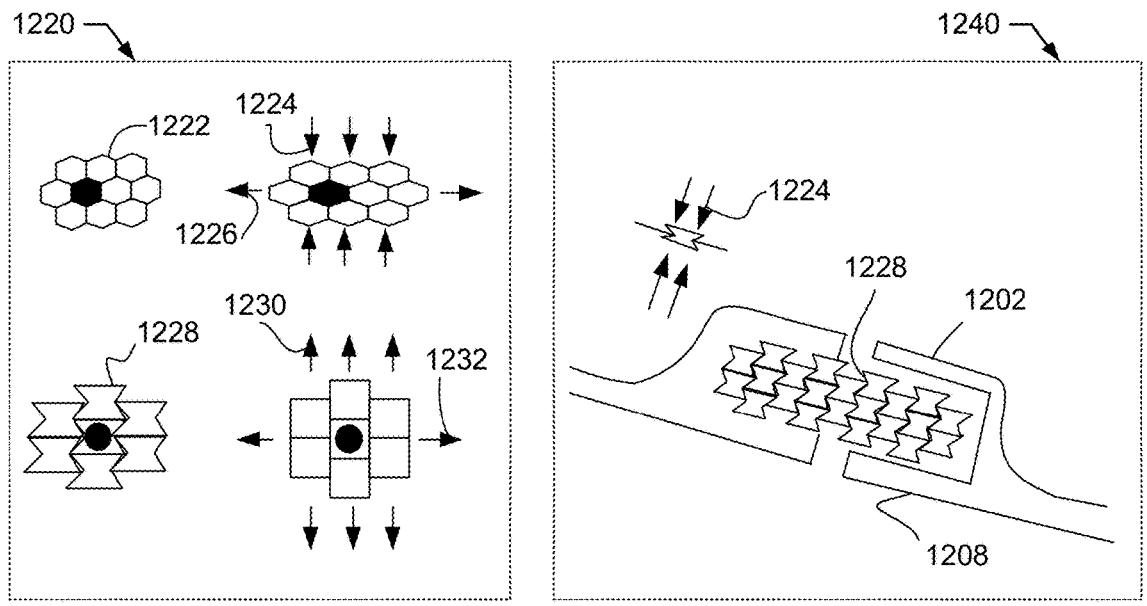
FIG. 12D illustrates variations of the spring seal hair pin structure for use in fairing assembly seals.
Figure 12D:
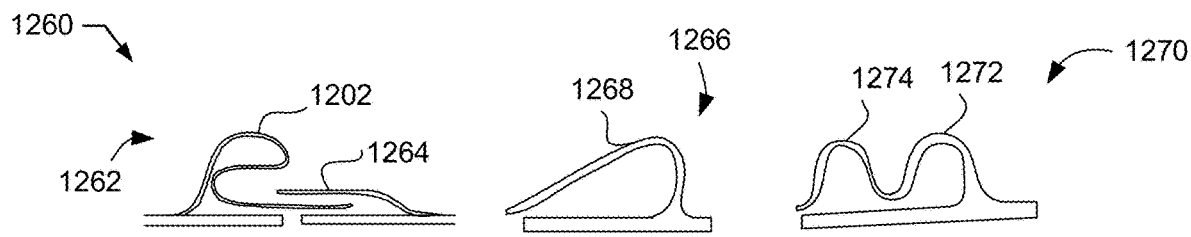

FIG. 12A illustrates end segments of a spring seal 1200 used to form seals in the illustrated turbine frame fairing assemblies 161 of FIGS. 2-4, FIG. 6, and FIG. 9. The example seal 1200 structure used as part of the single-piece fairing 202 of FIG. 2 can include curved edges 214, shaped to form an example hairpin-like structure 1202 (also referred to herein as a hairpin shape or a hairpin-like curved structure, as described in more detail in connection with FIG. 12D), with the curved edges 214 forming a uniform seal along example seal ligament 1206, such that the seal hairpin-like structure 1200 edges blend together with the rest of the fairing 202 structure. The hairpin-like structure 1202 can have a hollow interior 1204 (e.g., for fairing weight reduction). For example, the hairpin-like structure 1202 includes an acute inner angle (e.g., formed by bringing two edges of material close together to form an upper region with an oval and/or elongated shape formed as a result of a 180-360 degree bend of the hairpin-like structure material). The seal 1200 of FIG. 12 is designed to be integrated into the fairing surface 1208 and to interface with other fairings to form a full fairing assembly 161 extends circumferentially about the engine centerline axis (e.g., axis 104 of FIG. 1). The seal 1200 can be designed to reduce and/or eliminate any gaps between adjacent fairings. Such gaps can cause leakage of fluid flowing over the fairings (e.g., leakage of bypass airflow), causing reduced engine performance. Furthermore, it is desirable to form seals that are able to withstand high stress loads applied on the fairings.

FIG. 12B illustrates an example structural arrangement 1220 of an example auxetic material 1228 that can be used as part of the seal structure of FIG. 12A. An auxetic material has a negative Poisson's Ratio (PR) (e.g., negative of the ratio of transverse/lateral strain to axial/longitudinal strain under axial loading conditions). A majority of materials have a positive PR, such that materials compressed along an axis expand in directions transverse to the applied axial load, while contracting along the axis when a tensile load is applied along an axis transverse to the axis of contraction. In FIG. 12B, a regular material 1222 with a positive PR contracts 1224 along the transverse direction when a tensile load or deflection 1226 is applied in an axial direction. An auxetic material (e.g., metallic foam) having a negative PR contracts/expands in the transverse direction when compressed/stretched in the axial direction. In FIG. 12B, an auxetic material 1228 stretched along axial direction 1232 expands along transverse direction 1230. In some examples, the auxetic material can be embedded within a host matrix. Additionally, the auxetic material 1228 can have repeating patterns (e.g., 3D-geometry void or slot features) that can be engineered to exhibit a specific negative PR behavior and desired stress performance (e.g., load damping) and thermal cooling (e.g., heat damping).

As illustrated in FIG. 12A, the hairpin shape 1202 can be formed as a fraction of a cell of the auxetic material 1228 from FIG. 12B. FIG. 12C illustrates use 1240 of the auxetic material 1228 of FIG. 12B as part of the seal 1200 structure of FIG. 12A. By incorporating the auxetic material 1228 into the seal 1200 that links the fairing edges together, the presence of any stretching 1226 that occurs as a result of material deformation (e.g., expansion) associated with high operating temperatures causes the seal 1200 to thicken as a result of the auxetic material 1228 behavior described in FIG. 12B. If compression occurs (e.g., a compressive force is applied), the auxetic material 1228 can contract in a lateral direction and will not be loaded from the hairpin shape 1202 transverse walls. The auxetic material 1228 can be incorporated into the seal as shown in FIG. 12C, such that the auxetic material 1228 is positioned between each of the hairpin-like structure(s) 1202 and is further encapsulated by the presence of the fairing surface 1208 (e.g., outer band 204 and/or inner band 206). While in FIGS. 12A-12C the seal 1200 is shown to have a hairpin-like curved structure 1202 such that the curved structure is symmetrical on both sides, the seal 1200 is not limited to this particular design and can be shaped into any other form, with some example seal structures 1260 shown in FIG. 12D.

FIG. 12D illustrates seal structure variations 1260 of the spring seal hairpin structure for use in fairing assembly seals. In FIG. 12D, the seal variations 1260 include a hairpin single-side seal 1262, an example single-wave seal structure 1266, and a double-wave seal structure 1270. The hairpin single-side seal 1262 includes a hairpin-like structure 1202 (e.g., having a hairpin shape) and a flattened seal structure 1264. The single-wave seal structure 1266 includes a single raised wave structure 1268, while the double-wave seal structure 1270 includes a first raised wave structure 1272 and an adjacent second raised wave structure 1274. A specific seal design 1200, 1262, 1266, and/or 1270 can be selected based on the structure that reduces the thermal gradient. A seal structure with more surface area (e.g., hairpin single-side seal 1262) can allow more area of the fairing surface to be exposed to compressed air flow. Furthermore, the selected spring seal design must be able to permit segmental fairing linkage to take on any circumferential load. The material selected for seal structure (e.g., hairpin seal, etc.) can be an alloy used as a single piece part with the fairing 202. For example, a rene alloy (e.g., Rene 41, Rene 80, Rene 95, Rene 108, Rene N5, etc.) and/or material (e.g., nickel-based alloy, Haynes alloy, TMS alloy, etc.) can be used for formation of the seal structure, as well as any such material that can be used in an additive manufacturing process.

Figure 13:
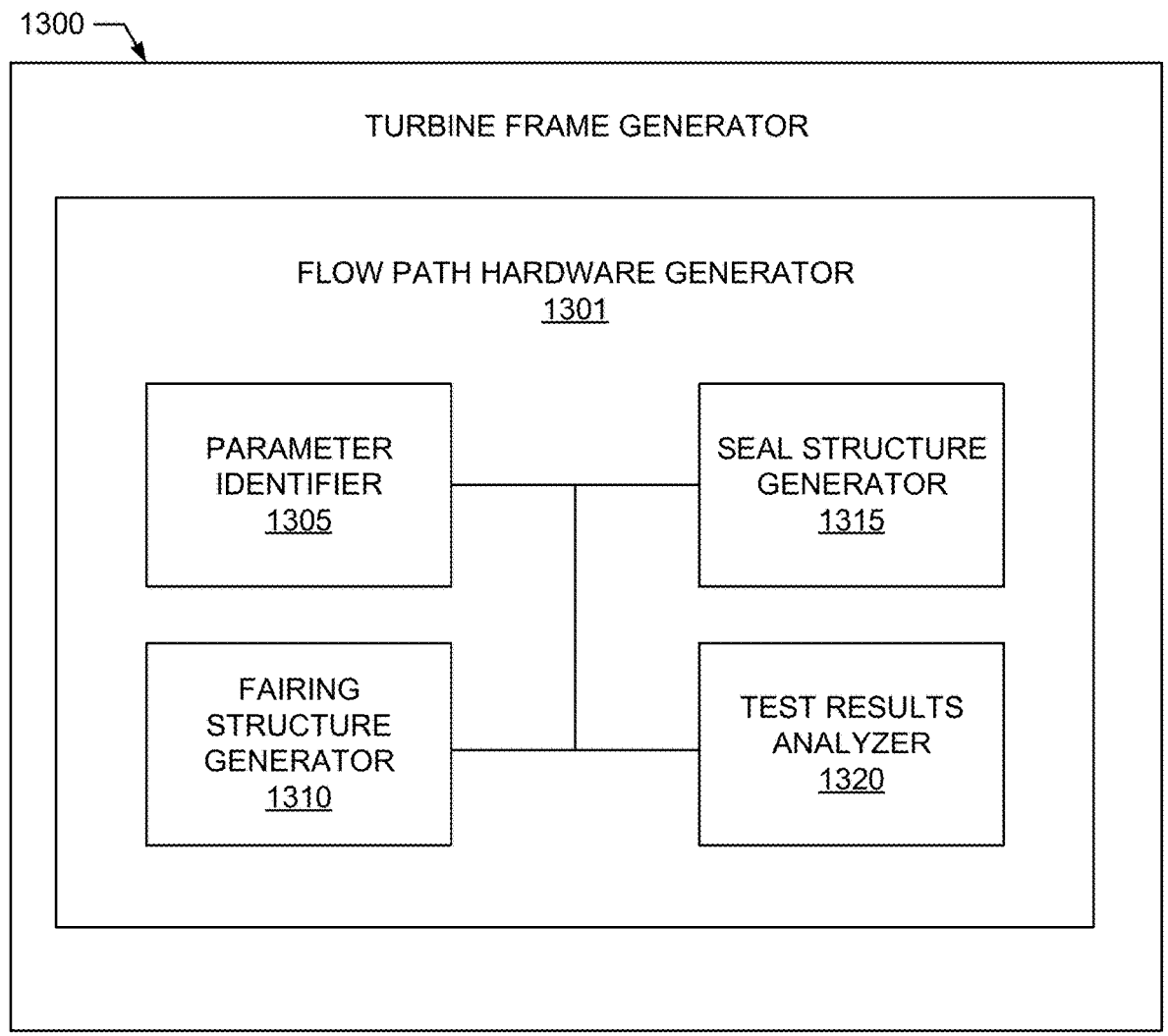
FIG. 13 is a block diagram of an example implementation of a turbine frame generator by which the examples disclosed herein can be implemented.

FIG. 13 is a block diagram of an example implementation of a turbine frame generator 1300. The turbine frame generator 1300 of FIG. 13 can include hardware, software, firmware, robots, machines, etc. structured to generate the example turbine frame fairing assembly 161 of FIG. 1. The turbine frame generator 1300 can generate fairing design, test fairing designs, and/or generate the example fairing assembly 161 based on the generated and/or tested fairing design. As such, the example fairing assembly 161 can be designed, modeled, manufactured, and/or assembled using the example turbine frame generator 1300. The components of the fairing assembly 161 (e.g., vane 208, seal(s) 1200, etc.) can be designed, modeled, manufactured, and/or assembled using the flow path hardware generator 1301. The flow path hardware generator 1301 includes a parameter identifier 1305, a fairing structure generator 1310, a seal structure generator 1315, and a test results analyzer 1320.

The parameter identifier 1305 identifies parameters to create a fairing structure 202 and/or fairing seal 1200 design. Such parameters can include a type of material being selected for use (e.g., low-grade material versus high-grade material), an intended size of the fairing assembly 161 (e.g., based on the gas turbine engine 102 size), a size of the strut 902 to be positioned within the hollow structure 212 of the fairing vane 208, the expected flow path 218 air pressure originating from the HP turbine 128, the expected flow path 904 air pressure within the strut 902, etc. Furthermore, such parameters can be varied. However, other potential parameters to determine the fairing structure 202 and/or fairing seal 1200 design include the total stresses and thermal loads exerted on the flow path hardware components. The parameter identifier 1305 can retrieve such parameters from previously-fabricated fairing designs. The parameter identifier 1305 can also predict and/or identify the effect of a parameter variation on the final fairing 202 and/or seal 1200 structure design (e.g., higher temperatures can result in higher thermal gradients, causing the parameter identifier 1305 to indicate the maximum temperature thresholds that can be used for a specific fairing structure design).

The fairing structure generator 1310 can determine the fairing structure design and/or generate (e.g., model, manufacture, assemble, etc.) the fairing structure based on the design. In the examples disclosed herein, the fairing structure generator 1310 can form a single-piece fairing. However, the fairing structure generator 1310 can also form a segmented and/or spit fairing if the design is altered to include split and/or segmented features. The fairing structure generator 1310 determines the fairing lattice structure 230 to be used, such that the fairing structure generator 1310 can generate a single 360-degree fairing component with a double-layer wall lattice structure in between. The fairing structure generator 1310 incorporates the lattice structure into all of the fairing or a specific part of the fairing (e.g., outer band 204, inner band 206, double-wall 606, etc.). Additionally, the fairing structure generator 1310 determines a lattice structure area 232 layout (e.g., lattice structure orientation) based on increased rate of heat transfer, higher load carrying capacity, increased access to cooling flow, lower weight of the fairing structure, etc., as described in connection with FIG. 2. Furthermore, the fairing structure generator 1310 can determine the location, positioning, size, geometry, and/or arrangement of the openings 210 within the outer vane surface 304 and/or the inner vane surface 306, based on parameter values provided by the parameter identifier 1305. The fairing structure generator 1310 can further determine the fairing component (e.g., double-wall 606) thickness, spacing, and/or length.

The fairing structure generator 1310 can form the fairing structure using additive manufacturing techniques or processes. Such processes can include formation of successful layers of material(s) on each other to create layer-by-layer, three-dimensional component(s) (e.g., fusion of layers to form a monolithic component having a variation of integral sub-components, layer-additive processes, layer-subtractive processes, and/or hybrid processes, etc.). Potential additive manufacturing technique used herein can include, but are not limited to, fused deposition modeling (FDM), selective laser sintering (SLS), electron beam melting (EBM), laser net shape manufacturing (LNSM), direct metal deposition (DMD), direct selective laser melting (DSLM), etc. However, any other forms of manufacturing (additive manufacturing-based or otherwise) applicable for the formation of the flow path hardware parts disclosed herein are possible. Furthermore, the manufacturing processes used to form the flow path hardware components can include use of any suitable material and/or combination of materials, including, but not limited to, metal, ceramic, polymer, nickel alloys, chrome alloys, titanium, titanium alloys, aluminum, aluminum alloys, iron, iron alloys, stainless steel, etc.

The seal structure generator 1315 can be used to form the seal 1200, including the fairing edges 214, such that the fairing edges 214 are integrated into the rest of the fairing 202 structure and link the adjacent fairings 202 to form the fairing assembly 161. The seal structure generator 1315 can form a variety of seal designs (e.g., seal designs 1260) for testing to determine a design that provides reduced thermal gradients and/or increased stress tolerance. The seal structure generator 1315 can determine the auxetic material 1228 geometry for use within the seal 1200 for increased stress resistance and improved integration with the fairing structure 202 generated using the fairing structure generator 1310. In some examples, the seal structure generator 1315 can form the seal structure using additive manufacturing techniques or processes. Such processes can include formation of successful layers of material(s) on each other to create layer-by-layer, three-dimensional component(s) (e.g., fusion of layers to form a monolithic component having a variation of integral sub-components, layer-additive processes, layer-subtractive processes, and/or hybrid processes, etc.). Potential additive manufacturing technique used herein can include, but are not limited to, fused deposition modeling (FDM), selective laser sintering (SLS), electron beam melting (EBM), laser net shape manufacturing (LNSM), direct metal deposition (DMD), direct selective laser melting (DSLM), etc. However, any other forms of manufacturing (additive manufacturing-based or otherwise) applicable for the formation of the seal parts disclosed herein are possible. Furthermore, the manufacturing processes used to form the seal components can include use of any suitable material and/or combination of materials, including but not limited to a rene alloy (e.g., Rene 41, Rene 80, Rene 95, Rene 108, Rene N5, etc.) and/or other type of material that can be used for formation of the seal structure (e.g., nickel-based alloy, Haynes alloy, TMS alloy, etc.), as well as any such material that can be used in an additive manufacturing process.

The test results analyzer 1320 can be used to perform testing and/or analyze test results as part of the flow path hardware design and development (e.g., including the fairing structure 202 and/or the seal structure 1200) in order to meet regulatory and other established guidelines. The test results analyzer 1320 can use sensors placed on the fabricated structures, as well as on a gas turbine engine that may be tested using the fabricated structures, to determine performance at operating temperatures, identify thermal gradient profiles, perform full load full pressure testing, response to cooling flow path variations, etc. The test results analyzer 1320 can be used to test various materials (e.g., higher-grade materials versus lower-grade material) to determine their performance at operating conditions using the selected fairing structure and/or seal design(s). Furthermore, the test results analyzer 1320 can be used to determine how the testing results can vary if the structures are to be used in next generation engine architectures (e.g., geared architecture).

While an example implementation of the turbine frame generator 1300 is illustrated in FIG. 13, one or more of the elements, processes and/or devices illustrated in FIG. 13 may be combined, divided, re-arranged, omitted, eliminated and/or implemented in any other way. Further, the example parameter identifier 1305, the example fairing structure generator 1310, the example seal structure generator 1315, the example test results analyzer 1320, and/or, more generally, the example flow path hardware generator 1301 of FIG. 13 may be implemented by hardware, software, firmware and/or any combination of hardware, software and/or firmware. Thus, for example, any of the example parameter identifier 1305, the example fairing structure generator 1310, the example seal structure generator 1315, the example test results analyzer 1320, and/or, more generally, the example flow path hardware generator 1301 of FIG. 13 can be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example parameter identifier 1305, the example fairing structure generator 1310, the example seal structure generator 1315, the example test results analyzer 1320, and/or, more generally, the example flow path hardware generator 1301 of FIG. 13 is/are hereby expressly defined to include a non-transitory computer readable storage device or storage disk such as a memory, a digital versatile disk (DVD), a compact disk (CD), a Blu-ray disk, etc. including the software and/or firmware. Further still, the example flow path hardware generator 1301 of FIG. 13 may include one or more elements, processes and/or devices in addition to, or instead of, those illustrated in FIG. 13, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 14:
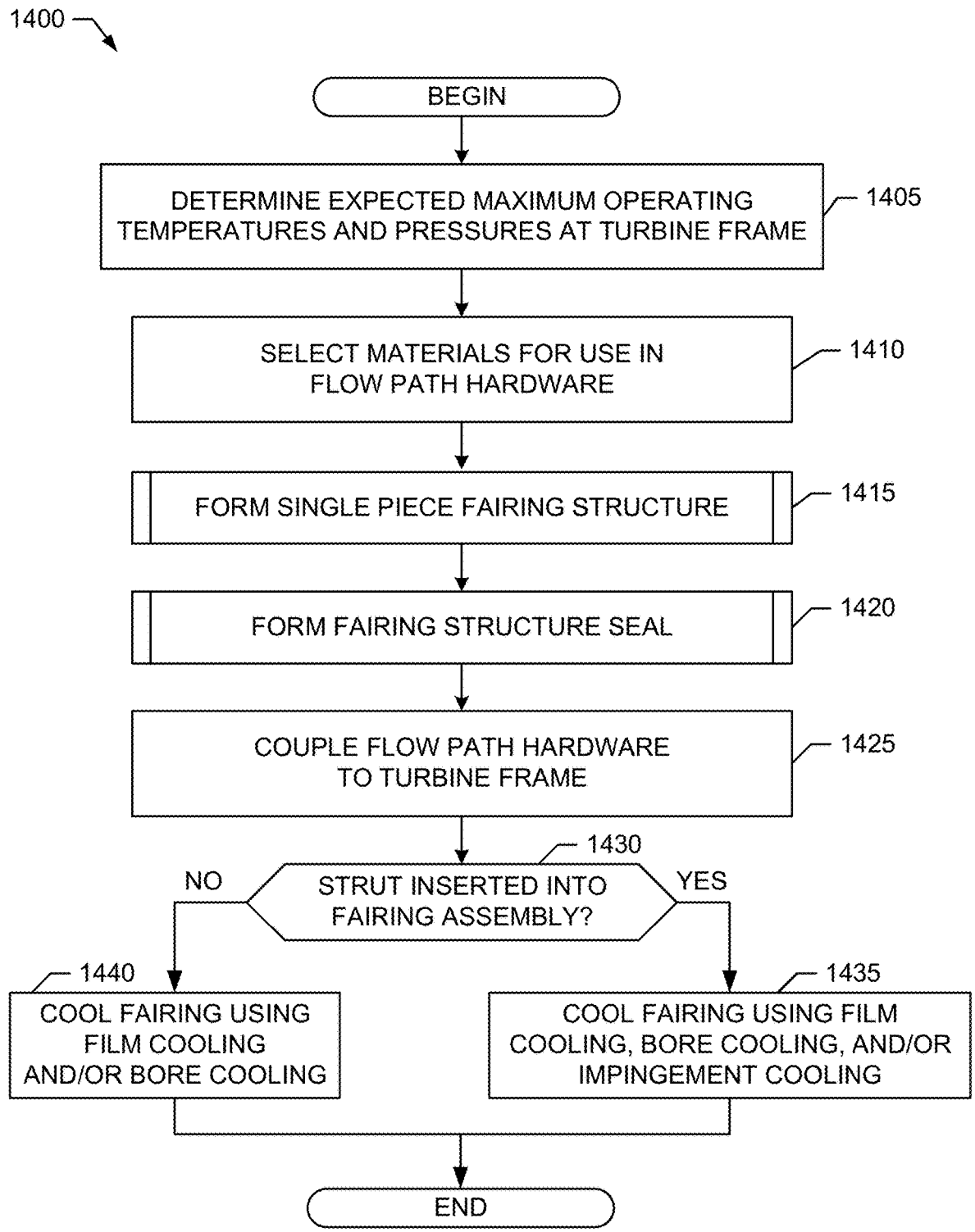
FIG. 14 illustrates a flowchart representative of example machine readable instructions which may be executed to implement the example flow path hardware generator of FIG. 13.
Figure 15:
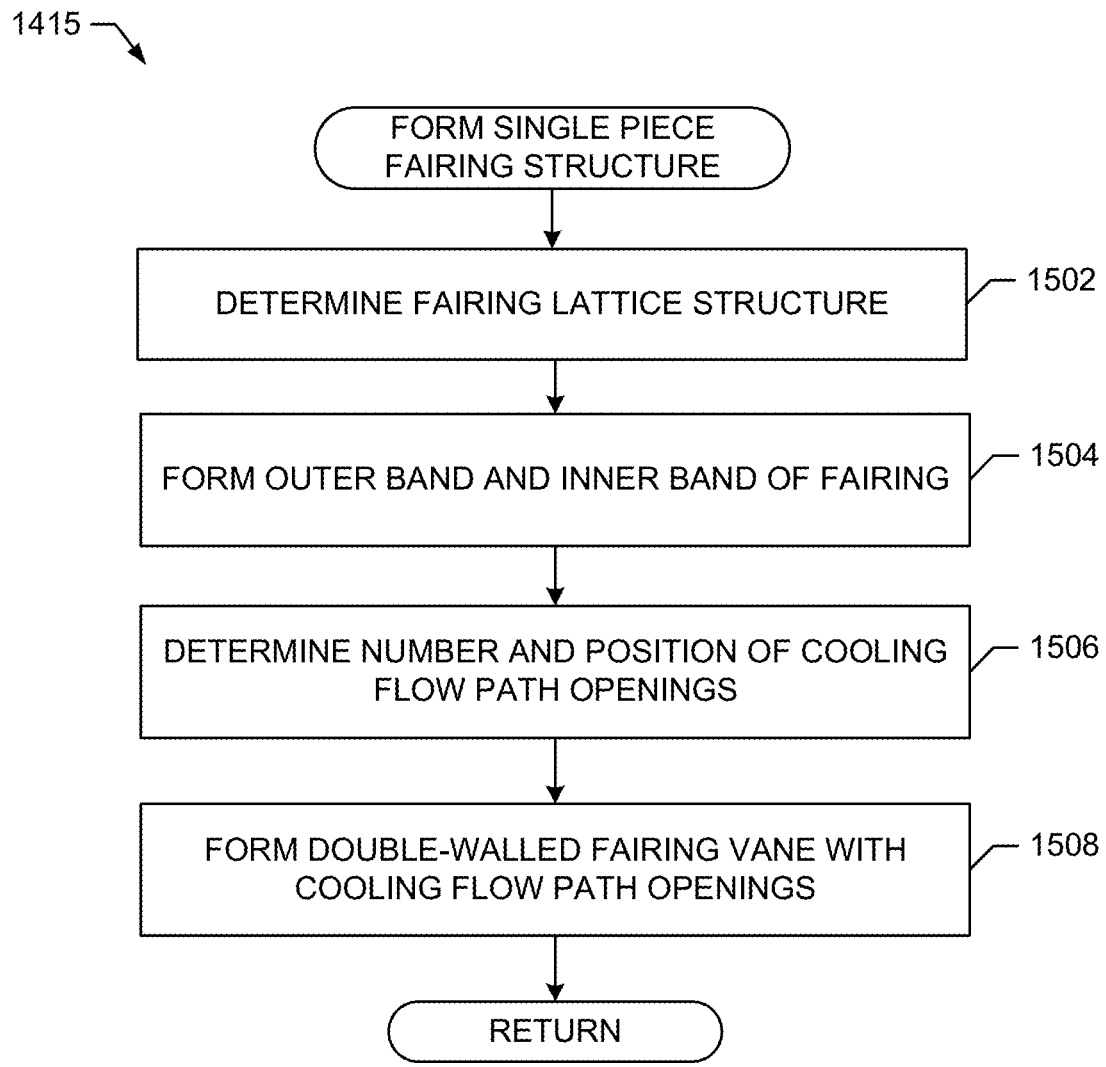
FIG. 15 illustrates a flowchart representative of example machine readable instructions which may be executed to implement a fairing structure generator as part of the example flow path hardware generator of FIG. 13.
Figure 16:
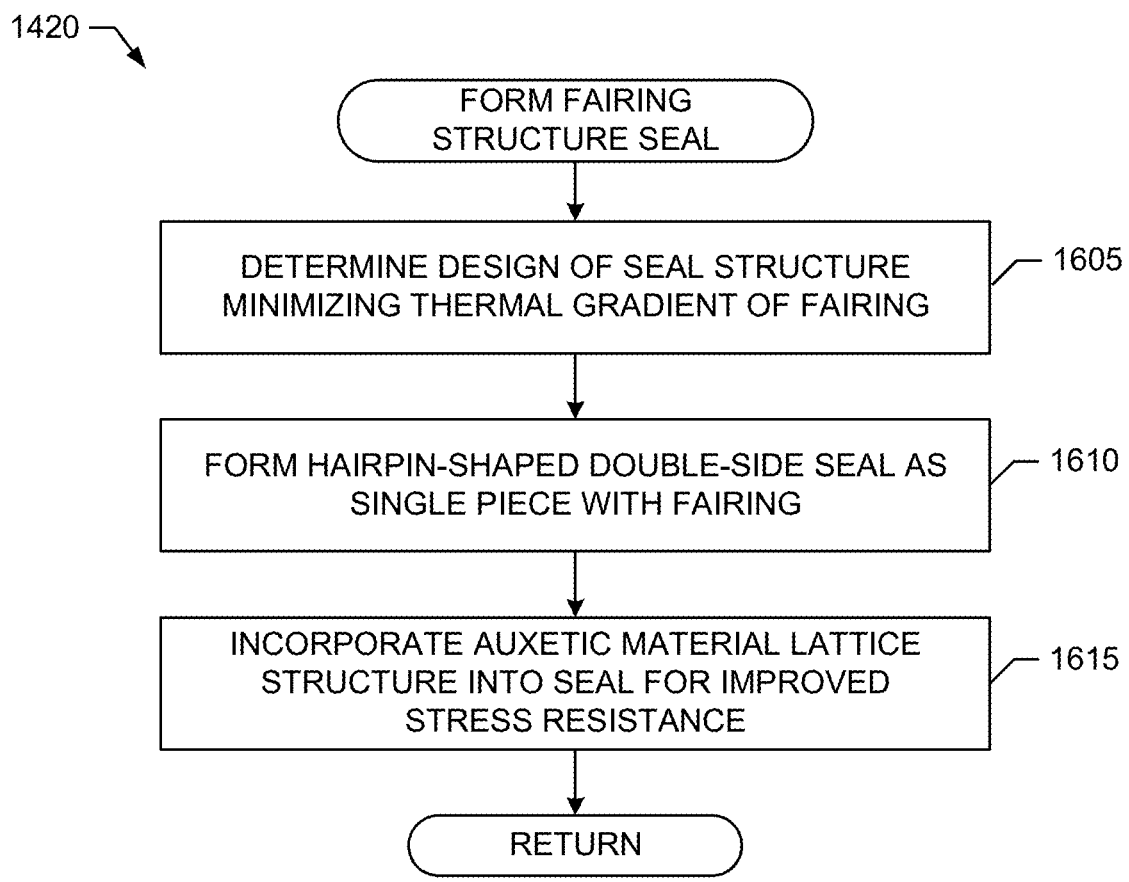
FIG. 16 illustrates a flowchart representative of example machine readable instructions which may be executed to implement a seal structure generator as part of the example flow path hardware generator FIG. 13.

Flowcharts representative of example hardware logic, machine readable instructions, hardware implemented state machines, and/or any combination thereof for implementing the flow path hardware generator 1301 of FIG. 13 are shown in FIGS. 14-16. The machine readable instructions may be one or more executable programs or portion(s) of an executable program for execution by a computer processor such as the processor 1712 shown in the example processor platform 1700 discussed below in connection with FIG. 17. The program may be embodied in software stored on a non-transitory computer readable storage medium such as a CD-ROM, a floppy disk, a hard drive, a DVD, a Blu-ray disk, or a memory associated with the processor 1712, but the entire program and/or parts thereof could alternatively be executed by a device other than the processor 1712 and/or embodied in firmware or dedicated hardware. Further, although the example program is described with reference to the flowchart illustrated in FIGS. 14-16, many other methods of implementing the example flow path hardware generator 1301 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 5-7 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

FIG. 14 illustrates a flowchart 1400 representative of example machine readable instructions which can be executed to implement the example flow path hardware generator 1301 of FIG. 13. The parameter identifier 1305 determines an expected maximum operating temperature (e.g., 1,000° C.) and pressure (e.g., 130 psia) at the turbine frame (block 1405), as well as other parameter values to determine the structure and/or properties of the materials to be used in the design and/or fabrication of flow path hardware (e.g., fairing 202, seal 1200, etc.). The flow path hardware generator 1301 determines materials (e.g., chrome alloys, titanium, aluminum, etc.) to be used in the flow path hardware design and/or fabrication process (block 1410). The fairing structure generator 1310 forms a single-piece fairing structure (block 1415) using a first manufacturing process (e.g., an additive manufacturing process and/or metal casting process). For example, the single-piece fairing structure includes fairing 202 components such as the vane(s) 208 that can be formed using nickel-based cast metallic alloys. The seal structure generator 1315 forms the fairing structure seal (block 1420) using the first manufacturing process and/or a second manufacturing process (e.g., chemo-mechanical process, thermo-mechanical process, etc.). Once the fairing structure 202 and seal structure 1200 are formed, the flow path hardware generator 1301 can form the full fairing assembly 161 for use in a turbine frame (e.g., turbine center frame, turbine vane frame, turbine rear frame, turbine mid frame, etc.) by attaching multiple fairing structures 202 together via the seal structures 1200 to form a continuing, circumferentially-extending structure. The flow path hardware generator 1301 then couples the flow path hardware (e.g., fairing, seal, etc.) to the turbine frame (e.g., turbine center frame, turbine vane frame, turbine rear frame, turbine mid frame, etc.) (block 1425). The flow path hardware generator 1301 can determine the type of cooling to be used in the flow path hardware system based on whether a strut is inserted into the hollow structure 212 of the vane. If the strut 902 is to be positioned within the fairing 202 (e.g., inside hollow structure 212) (block 1430), the cooling can include film cooling, bore cooling, and/or impingement cooling (block 1435). As such, the flow path hardware generator 1301 can determine whether the strut 902 should include a specific arrangement and/or positioning of holes (e.g., to allow impingement cooling and/or cooling via impingement baffle(s) of the strut 902). Additionally, if the strut 902 is not positioned within the fairing 202, the cooling of the fairing can occur using film cooling and/or bore cooling (block 1440).

FIG. 15 illustrates a flowchart 1415 representative of example machine readable instructions which can be executed to implement the fairing structure generator 1310 of the flow path hardware generator 131301 of FIG. 13. The fairing structure generator 1310 determines the fairing lattice structure 230 of the example fairing 202 of FIG. 2 (e.g., based on the parameter identifier 1305 values and/or other structural and/or functional property requirements of the fairing) (block 1502). The fairing structure generator 1310 forms the outer band 204 and/or the inner band 206 of the fairing 202 using a manufacturing process (e.g., additive manufacturing such as direct metal deposition and/or a metal casting process, etc.) (block 1504). The fairing structure generator 1310 can determine a number, geometry, positioning, and/or size of the vane openings 210 for routing of cooling flow based on assessment of cooling efficiency using a specific vane opening design (block 1506). The fairing structure generator 1310 can also generate a variety of fairing 202 lattice structures, cool air flow openings 210, as well as inner band 206 and/or outer band 204 designs in order to allow for testing and assessment (e.g., using the test results analyzer 1320) of the fairing structure performance under specific conditions (e.g., thermal, pressure, etc.). The fairing structure generator 1310 can use additive manufacturing to generate the various designs in order to reduce the time needed to form the parts, as compared to using traditional manufacturing techniques, while allowing a greater number of designs to be tested for comparison. Once a design is tested and verified in an engine-based operational setting (e.g., tested at maximum operating temperatures and pressures), the parts of the fairing (e.g., outer band 204, inner band 206, and/or seal(s) 1200) can be formed as a single-piece structure by attaching the fairing components together (e.g., using fasteners, bolts, brackets, etc.). The parts of the fairing can be combined to form a single structure using additive manufacturing (e.g., the fairing structure generator 1310 combines the outer band 204, the inner band 206, the vane 208, and or other fairing 202 structure to form a single-piece fairing 202). For example, once the number of openings 210 and/or the positioning of the openings 210 are determined, the fairing structure generator 1310 can form the double-walled fairing vane 208 that has the cooling flow path openings 210 and/or 302 embedded within its structure (e.g., in the inner vane structure 304 and the outer vane structure 306) using additive manufacturing process and/or injection molding (block 1508).

FIG. 16 illustrates a flowchart 1420 representative of example machine readable instructions which can be executed to implement the seal structure generator 1315 of the flow path hardware generator 1301 of FIG. 13. The seal structure generator 1315 determines a design of the seal 1200 structure based on one or more parameter values identified by the parameter identifier 1305 (e.g., expected maximum temperatures, etc.). The seal structure generator 1315 can determine the seal structure design that reduces a thermal gradient of the fairing by using a finite element analysis model to predict thermal stresses (block 1605). Additionally, the seal structure generator 1315 can form a hairpin-shaped double-side seal (e.g., fairing edge 214) that can be used to secure adjacent fairing structures 202 by positioning the seal on the outer and/or inner edges 214 of the fairings (block 1610). However, any seal structure described herein or a variation thereof can be used to form a seal 1200 to allow the fairing structures 202 to be combined to form a fairing assembly 161. The seal structure generator 1315 further incorporates and/or embeds an auxetic material 1228 into the seal 1200 structure for improved stress resistance and decreased material stress fatigue using a molding and/or thermo-mechanical process (block 1615). The seal structure generator 1315 can use the test results analyzer 1320 to determine the type of geometry to be used for the auxetic structure within the seal 1200 (e.g., based on which geometry results in resistance to anticipated loads to be experienced at the fairing edges 214). For example, modeling of various auxetic structure geometries and anticipated loads at the fairing edges using finite element analysis can allow the seal structure generator 1315 to select one or more auxetic structure geometries that have a high tolerance to maximum anticipated loads at the fairing edges 214.

Figure 17:
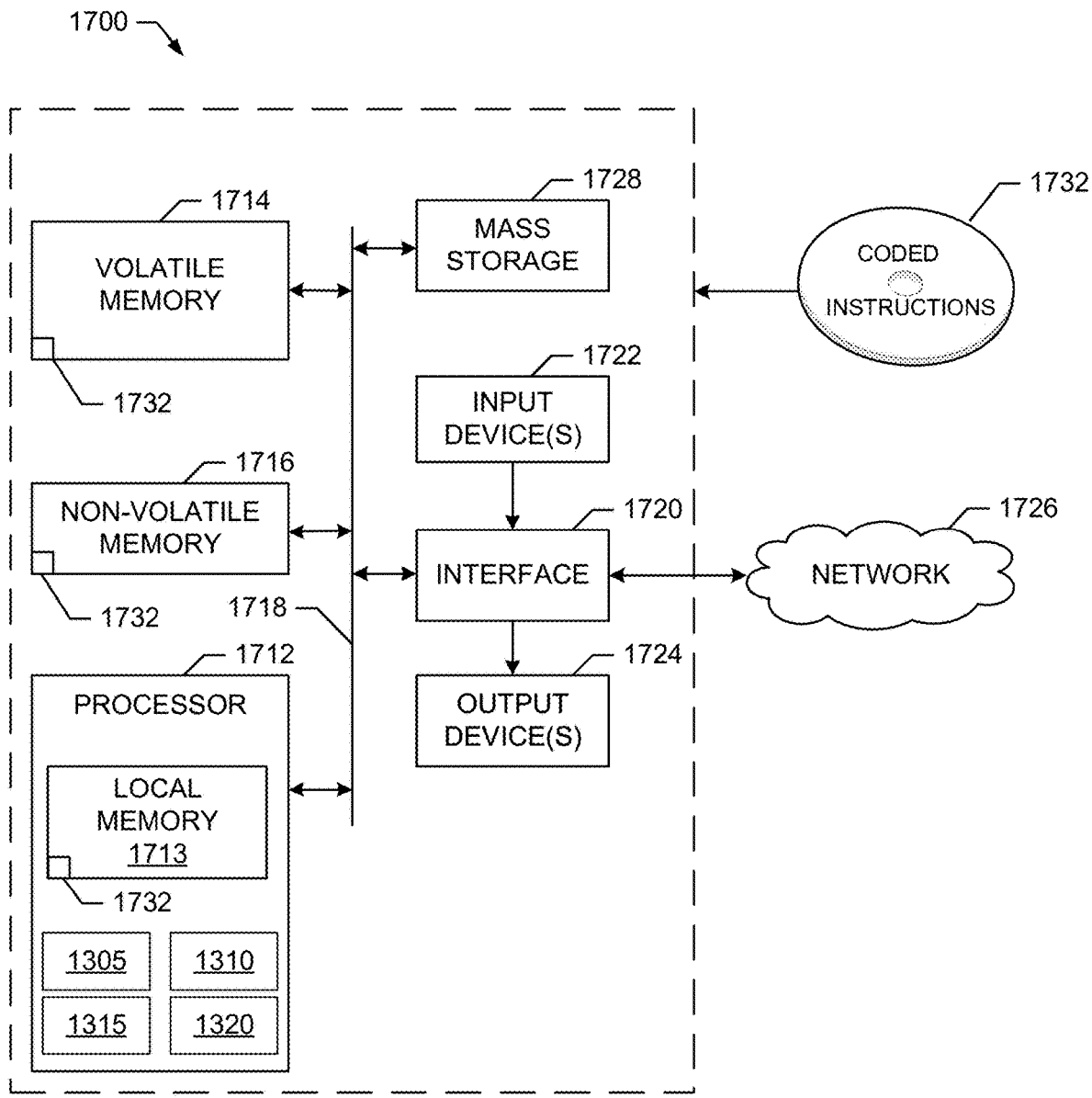
FIG. 17 is a block diagram of an example processing platform structured to execute the instructions of FIGS. 14-16 to implement the example flow path hardware generator of FIG. 13.

FIG. 17 is a block diagram of an example processor platform structured to execute the instructions of FIGS. 14-16 to implement the flow path hardware generator 1301 of FIG. 13. The processor platform 1700 can be a server, a personal computer, a workstation, a self-learning machine (e.g., a neural network), or any other type of computing device.

The processor platform 1700 of the illustrated example includes a processor 1712. The processor 1712 of the illustrated example is hardware. For example, the processor 1712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 1712 implements the example parameter identifier 1305, the example fairing structure generator 1310, the example seal structure generator 1315, and an example test results analyzer 1320.

The processor 1712 of the illustrated example includes a local memory 1713 (e.g., a cache). The processor 1712 of the illustrated example is in communication with a main memory including a volatile memory 1714 and a non-volatile memory 1716 via a bus 1718. The volatile memory 1714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1716 may be implemented by flash memory and/or any other desired type of memory device. Access to the main memory 1714, 1716 is controlled by a memory controller.

The processor platform 1700 of the illustrated example also includes an interface circuit 1720. The interface circuit

820 may be implemented by any type of interface standard, such as an Ethernet interface, a universal serial bus (USB), a Bluetooth® interface, a near field communication (NFC) interface, and/or a PCI express interface.

In the illustrated example, one or more input devices 1722 are connected to the interface circuit 1720. The input device(s) 1722 permit(s) a user to enter data and/or commands into the processor 1712. The input device(s) 1722 can be implemented by, for example, an audio sensor, a microphone, a camera (still or video), a keyboard, a button, a mouse, a touchscreen, a track-pad, a trackball, isopoint and/or a voice recognition system.

One or more output devices 1724 are also connected to the interface circuit 1720 of the illustrated example. The output devices 1724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1720 of the illustrated example, thus, typically includes a graphics driver card, a graphics driver chip and/or a graphics driver processor.

The interface circuit 1720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1700 of the illustrated example also includes one or more mass storage devices 1728 for storing software and/or data. Examples of such mass storage devices 1728 include floppy disk drives, hard drive disks, compact disk drives, Blu-ray disk drives, redundant array of independent disks (RAID) systems, and digital versatile disk (DVD) drives.

The machine executable instructions 1732 of FIGS. 14-16 may be stored in the mass storage device 1728, in the volatile memory 1714, in the non-volatile memory 1716, and/or on a removable non-transitory computer readable storage medium such as a CD or DVD.

From the foregoing, it will be appreciated that the disclosed methods and apparatus permit improved turbine frame flow path hardware cooling. In the examples disclosed herein, a turbine frame fairing (e.g., TCF, TVF, TRF, etc.) can be formed as a single 360-degree component including flexible ligament sealing and/or a double-layer wall lattice structure in between. In some examples, cooling air can be used in between the double-layer wall lattice structure to control the bulk flow path hardware temperature. Improvement in the cooling of flow path hardware allows for replacement of existing materials used for manufacture of flow path hardware components (e.g., use of lower grade materials with lower temperature requirements, reduction of the expense associated with using higher grade materials, reduce component weight as a result of changing material(s) used in turbine frame, etc.) and/or allowing higher flow path temperatures to be used in combination with currently used materials given the ability to cool the flow path hardware components (e.g., reduce temperature-induced burden on flow path hardware components, increase cooling effectiveness, permit higher load carrying capacity, etc.). In some examples, the flow path hardware components described herein can be fabricated using additive manufacturing. As such, in the examples disclosed herein, the flow path hardware can be cooled or uncooled, depending on the intended application and/or material selection. In some examples, a new material (e.g., lower-grade material with a lower cost than, for example, a ceramic matrix composite (CMC)) can be used for the flow path hardware components, with cooling added using compressed air flow through the flow path hardware. In some examples, the double-walled fairing can be cooled using impingement cooling, bore cooling, and/or film cooling, etc. In some examples, the air can be recycled during the air-cooling process to allow for cooling of the entire double-walled, 360-degree single part fairing. The use of flow path hardware cooling, as described herein, can be applied in next generation high speed turbines (e.g., with geared architecture) to improve engine performance and hardware durability, for example.

While the examples disclosed herein describe gas turbine frame flow path hardware cooling in an example aircraft engine (e.g., engine 102 of FIG. 1), the methods and apparatus disclosed herein can be used in any turbine engine system. For example, the methods and apparatus disclosed herein can be applied to stationary gas turbine engines to generate power or electricity. Furthermore, the methods and apparatus disclosed herein can be used in any internal combustion engine with static and/or structural flow path hardware cooling. Likewise, while the examples disclosed herein use a turbine center frame (TCF) as an example turbine frame component in which the disclosed flow path hardware cooling methods and apparatus are applied, the use of the disclosed methods and apparatus are not limited to TCFs and can be applied in any type of turbine frame (e.g., turbine vane frame (TVF), turbine rear frame (TRF), turbine mid frame (TMF), and/or any other structural frame of an engine).

The presently described technology can be implemented according to a plurality of examples. In certain examples, the strut 902 provides a first means for directing cooling air flow, the first means for directing air flow to direct air flow radially inward through the fairing. In certain examples, the double-walled vane 208 further provides a second means for directing the cooling air flow, the second means to direct air flow from the first means through a double-wall of the fairing.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

Further aspects of the invention are provided by the subject matter of the following clauses:

An engine fan case fairing, the fairing including an outer band and an inner band, the outer band and the inner band connected using a double-walled vane, the vane including openings to pass cooling air flow from the outer band to an airfoil of the fairing. The fairing further includes an end segment seal, the seal formed on an edge of the fairing using an auxetic material.

The engine fan case fairing of any preceding clause wherein the fairing is a single-piece fairing.

The engine fan case fairing of any preceding clause wherein the fairing includes a lattice structure, the lattice structure to reduce fairing weight.

The engine fan case fairing of any preceding clause wherein the fairing forms at least one of a turbine center frame, a turbine vane frame, a turbine rear frame, or a turbine mid frame.

The engine fan case fairing of any preceding clause wherein the fairing is positioned between a high pressure spool and a low pressure spool, the fairing to pass flow path air from a high pressure turbine to a low pressure turbine.

The engine fan case fairing of any preceding clause wherein the seal is formed to permit contraction in a lateral direction as a result of a compressive force acting on the seal.

The engine fan case fairing of any preceding clause wherein the seal is formed to reduce a thermal gradient at an edge of the fairing.

The engine fan case fairing of any preceding clause wherein the seal is formed using a hairpin-like structure, the hairpin-like structure to be symmetrical on both sides of the seal.

The engine fan case fairing of any preceding clause wherein the seal is to be stretched due to thermally-induced material expansion to cause the seal to thicken.

The engine fan case fairing of any preceding clause wherein the fairing is cooled using at least one of a film cooling, a bore cooling, or an impingement cooling.

The engine fan case fairing of any preceding clause wherein the impingement cooling includes impingement baffle-based cooling originating from baffles of a strut pierced with impingement cooling holes.

The engine fan case fairing of any preceding clause wherein the double-walled vane is formed using additive manufacturing.

A method to cool a fan case fairing, the method including directing cooling air flow radially inward through a first passage of the fairing, the first passage to direct the air flow through a turbine frame, the first passage of the fairing formed inside a strut, the strut positioned within a double-walled vane of the fairing. The method to cool a fan case fairing further includes directing cooling air flow through a second passage of the fairing, the second passage of the fairing to direct the cooling air flow from the strut to the double-walled vane of the fairing, the vane including openings to pass cooling air flow to an airfoil of the fairing.

The method of any preceding clause wherein at least one of the first passage or the second passage is formed using additive manufacturing.

The method of any preceding clause wherein the openings are positioned on a trailing edge of the vane.

The method of any preceding clause wherein the double-walled vane includes a first surface and a second surface, the first surface an inner vane wall surface and the second surface an outer vane wall surface.

The method of any preceding clause wherein at least one of the first surface or the second surface includes the openings for passage of the cooling air flow to an airfoil of the fairing.

The method of any preceding clause wherein directing cooling air flow through a second passage includes directing the cooling air through a set of openings on a trailing edge of a fairing airfoil.

The method of any preceding clause wherein the cooling air flow from the strut to the double-walled vane of the fairing includes filling the double-walled vane with cooling air.

An engine fan case fairing, the fairing including a first means for directing cooling air flow, the first means for directing air flow to direct air flow radially inward through the fairing, and a second means for directing the cooling air flow, the second means to direct air flow from the first means through a double-wall of the fairing.

The engine fan case fairing of any preceding clause wherein the fairing is a first fairing, and further including means for joining the first fairing to a second fairing at an edge of the first fairing and an edge of the second fairing, an auxetic material positioned within the means for joining the first fairing to the second fairing.

An engine including a fan case fairing, the fan case fairing including an outer band and an inner band, the outer band and the inner band connected using a double-walled vane, the vane including openings to pass cooling air flow from the outer band to an airfoil of the fairing. The fairing further includes an end segment seal, the seal formed on an edge of the fairing using an auxetic material.

The engine of any preceding clause wherein the fairing is a single-piece fairing.

The engine of any preceding clause wherein the fairing includes a lattice structure, the lattice structure to reduce fairing weight.

The engine of any preceding clause wherein the fairing forms at least one of a turbine center frame, a turbine vane frame, a turbine rear frame, or a turbine mid frame.

The engine of any preceding clause wherein the fairing is positioned between a high pressure spool and a low pressure spool, the fairing to pass flow path air from a high pressure turbine to a low pressure turbine.

The engine of any preceding clause wherein the seal is formed to permit contraction in a lateral direction as a result of a compressive force acting on the seal.

The engine of any preceding clause wherein the seal is formed to reduce a thermal gradient at an edge of the fairing.

The engine of any preceding clause wherein the seal is formed using a hairpin-like structure, the hairpin-like structure to be symmetrical on both sides of the seal.

The engine of any preceding clause wherein the seal is to be stretched due to thermally-induced material expansion to cause the seal to thicken.

The engine of any preceding clause wherein the fairing is cooled using at least one of a film cooling, a bore cooling, or an impingement cooling.

The engine of any preceding clause wherein the impingement cooling includes impingement baffle-based cooling originating from baffles of a strut pierced with impingement cooling holes.

The engine of any preceding clause wherein the double-walled vane is formed using additive manufacturing.

What is claimed is:

1. An engine fairing, the engine fairing comprising:
an outer band and an inner band, the outer band and the inner band connected using a double-walled vane, the double-walled vane including openings to pass cooling air flow from the outer band to an airfoil of the engine fairing, the engine fairing including a lattice structure, the lattice structure to limit vibration of the engine fairing, the double-walled vane including a leading edge and a trailing edge;
a strut extending through a hollow interior of the double-walled vane, wherein cooling air exits the strut through a passage on a side of the strut, the cooling air enters the double-walled vane at the leading edge and exits at the trailing edge; and
an end segment seal, the end segment seal formed on an edge of the engine fairing using an auxetic material, the end segment seal including a curved edge with an acute inner angle, wherein (1) a first layer of the outer band or the inner band forms the curved edge of the end segment seal and (2) a second layer of the outer band or the inner band forms a base of the end segment seal.

2. The engine fairing of claim 1, wherein the engine fairing is a single-piece fairing.

3. The engine fairing of claim 1, wherein the lattice structure is to reduce fairing weight.

4. The engine fairing of claim 1, wherein the engine fairing forms at least one of a turbine center frame, a turbine vane frame, a turbine rear frame, or a turbine mid frame.

5. The engine fairing of claim 1, wherein the engine fairing is positioned between a high pressure spool and a low pressure spool, the engine fairing to pass flow path air from a high pressure turbine to a low pressure turbine.

6. The engine fairing of claim 1, wherein the end segment seal is formed to permit contraction in a lateral direction as a result of a compressive force acting on the end segment seal.

7. The engine fairing of claim 1, wherein the end segment seal is formed to reduce a thermal gradient at an edge of the engine fairing.

8. The engine fairing of claim 1, wherein the end segment seal is formed using a hairpin-like structure, the hairpin-like structure to be symmetrical on both sides of the end segment seal.

9. The engine fairing of claim 1, wherein the end segment seal is to be stretched due to thermally-induced material expansion to cause the end segment seal to thicken.

10. The engine fairing of claim 1, wherein the engine fairing is cooled using at least one of a film cooling, a bore cooling, or an impingement cooling.

11. The engine fairing of claim 10, wherein the impingement cooling includes impingement baffle-based cooling originating from baffles of the strut pierced with impingement cooling holes.

12. The engine fairing of claim 1, wherein the double-walled vane is formed using additive manufacturing.

* * * * *